US 12,105,741 B2

(12) United States Patent
Yoshitake

(10) Patent No.: US 12,105,741 B2
(45) Date of Patent: Oct. 1, 2024

(54) INFORMATION-PROCESSING METHOD, SEARCH SYSTEM, AND SEARCH METHOD

(71) Applicant: NATIONAL INSTITUTE FOR MATERIALS SCIENCE, Tsukuba (JP)

(72) Inventor: Michiko Yoshitake, Matsudo (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 103 days.

(21) Appl. No.: 17/799,670

(22) PCT Filed: Feb. 9, 2021

(86) PCT No.: PCT/JP2021/004695
§ 371 (c)(1),
(2) Date: Aug. 13, 2022

(87) PCT Pub. No.: WO2021/166728
PCT Pub. Date: Aug. 26, 2021

(65) Prior Publication Data
US 2023/0082534 A1    Mar. 16, 2023

(30) Foreign Application Priority Data
Feb. 19, 2020   (JP) ................ 2020-026688

(51) Int. Cl.
*G06F 16/20*   (2019.01)
*G06F 16/28*   (2019.01)
*G06V 30/416*  (2022.01)

(52) U.S. Cl.
CPC ......... *G06F 16/287* (2019.01); *G06V 30/416* (2022.01)

(58) Field of Classification Search
None
See application file for complete search history.

(56) References Cited

U.S. PATENT DOCUMENTS

| 11,138,772 B2 | 10/2021 | Yoshitake et al. |
| 11,163,829 B2 | 11/2021 | Yoshitake et al. |

(Continued)

FOREIGN PATENT DOCUMENTS

| EP | 3591546 A1    | 1/2020 |
| JP | 2007-018444 A | 1/2007 |

(Continued)

OTHER PUBLICATIONS

Michiko Yoshitake, "Extraction of Mathematical Equations from Textbook and Equation Conversion," 67th Japan Society of Advanced Physics Spring Meeting 2020, Feb. 28, 2020.

(Continued)

*Primary Examiner* — Jau Shya Meng
(74) *Attorney, Agent, or Firm* — Potomac Law Group, PLLC

(57) ABSTRACT

Provided is a method of extracting a relational formula that relates two material property parameters from a textbook document using a computer and storing the extracted relational formula in a material property relationship database, which method enables search in consideration of a quantitative relationship between material properties. The information processing method according to the present invention comprises inputting a relational formula representing a relation between a pair of material property parameters in a material property relationship database storing pairs of mutually related material property parameters. Equation information representing a relational formula is extracted from read input data, and multiple variables constituting a relational formula and a relational formula specifying that relation are extracted from the equation information. Description defining each of the extracted variables is extracted from the input data, and each variable is associated with a material property parameter with reference to the (Continued)

material property relationship database. The extracted relational formula is input in the material property relationship database in association with the pair of material property parameters corresponding to two of the multiple variables constituting the relational formula.

20 Claims, 25 Drawing Sheets

(56) References Cited

U.S. PATENT DOCUMENTS

| | | | |
|---|---|---|---|
| 2007/0225853 A1* | 9/2007 | Matsushita | G05B 19/41875 700/109 |
| 2009/0171924 A1* | 7/2009 | Nash | G06F 16/3329 |
| 2019/0139279 A1 | 5/2019 | Yoshitake et al. | |
| 2020/0004911 A1* | 1/2020 | Kim | G06F 30/30 |
| 2020/0089800 A1* | 3/2020 | Bhojwani | G06F 16/2272 |
| 2020/0301672 A1* | 9/2020 | Li | G06F 11/3608 |
| 2021/0303601 A1* | 9/2021 | Yoshitake | G06F 16/367 |

FOREIGN PATENT DOCUMENTS

| | | |
|---|---|---|
| JP | 2020-021303 A | 2/2020 |
| JP | 2020-064337 A | 4/2020 |
| JP | 2021-012501 A | 2/2021 |
| WO | WO 2017/221444 A1 | 12/2017 |
| WO | WO 2018/159237 A1 | 9/2018 |

OTHER PUBLICATIONS

Michiko Yoshitake, "Material, Curation, Material Exploration Method Using Scientific Laws from a Perspective of Overhead," *J. Comput. Chem. Jpn.*, vol. 19, No. 2, pp. 36-42, Oct. 27, 2020.

International Search Report from International Patent Application No. PCT/JP2021/004695, Apr. 27, 2021.

Extended European Search Report issued Jun. 22, 2023, in European Patent Application No. 21756526.6.

Replacement European Search Report issued Aug. 31, 2023, in European Patent Application No. 21756526.6.

Office Action issued May 27, 2024, in European Patent Application No. 21756526.6.

\* cited by examiner

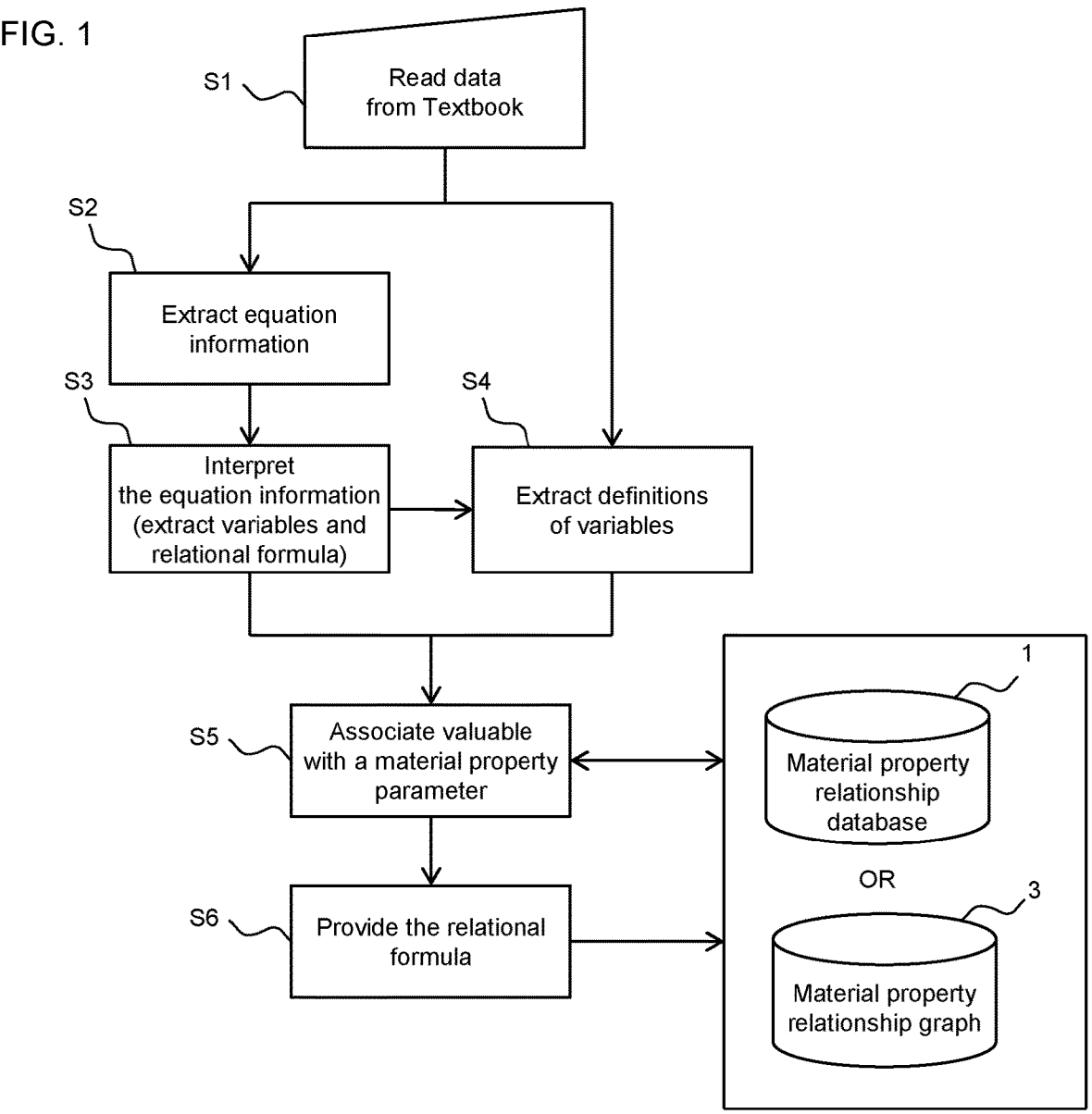

FIG. 2

| Cause-side material property parameter | Effect-side material property parameter | Relational formula | Condition |
|---|---|---|---|
| frequency factor, $D_0$ | diffusion coefficient, D | | |
| activation energy, Q | diffusion coefficient, D | | |
| diffusion coefficient, D | activation energy, Q | | |

⇩

| Cause-side material property parameter | Effect-side material property parameter | Relational formula | Condition |
|---|---|---|---|
| frequency factor, $D_0$ | diffusion coefficient, D | content MathML format of $D = D_0 \exp\left(-\dfrac{Q}{RT}\right)$ | |
| activation energy, Q | diffusion coefficient, D | content MathML format of $D = D_0 \exp\left(-\dfrac{Q}{RT}\right)$ | |
| diffusion coefficient, D | activation energy, Q | | |

⇩

| Cause-side material property parameter | Effect-side material property parameter | Relational formula | Condition |
|---|---|---|---|
| frequency factor, $D_0$ | diffusion coefficient, D | content MathML format of $D = D_0 \exp\left(-\dfrac{Q}{RT}\right)$ | |
| activation energy, Q | diffusion coefficient, D | content MathML format of $D = D_0 \exp\left(-\dfrac{Q}{RT}\right)$ | |
| diffusion coefficient, D | activation energy, Q | content MathML format of $Q = -RT \ln\left(\dfrac{D}{D_0}\right)$ | |

FIG. 3

5-6  Factors Affecting Diffusion

Temperature and the Diffusion Coefficient
The kinetics of diffusion are strongly dependent on temperature. The diffusion coefficient $D$ is related to temperature by an Arrhenius-type equation, $$D = D_0 \exp\left(\frac{-Q}{RT}\right) \quad (5\text{-}4)$$

where $Q$ is the activation energy (in units of cal/mol) for diffusion of the species under consideration (e.g., Al in Si), $R$ is the gas constant $\left(1.987 \frac{cal}{mol \cdot K}\right)$, and $T$ is the absolute temperature (K). $D_0$ is the pre-exponential term, similar to $c_0$ in Equation 5-1.

$D_0$ is a constant for a given diffusion system and is equal to the value of the diffusion coefficient at $1/T = 0$ or $T = \infty$. Typical values for $D_0$ are given in Table 5-1, while the temperature dependence of $D$ is shown in Figure 5-12 for some metals and ceramics. Covalently bonded materials, such as carbon and silicon (Table 5-1), have unusually high

FIG. 4

$$D = D_0 \exp\left(\frac{-Q}{RT}\right)$$

FIG. 5

```
<math xmlns="http://www.w3.org/1998/Math/MathML"><mi mathvariant="italic">D</mi><mi mathvariant="normal">=</mi><msub><mi mathvariant="italic">D</mi><mrow><mn mathvariant="normal">0</mn></mrow></msub><mi class="unknown_entity" mathvariant="normal">exp</mi><mi mathvariant="normal">(</mi><mfrac><mrow><mo mathvariant="normal">-</mo><mi mathvariant="italic">Q</mi></mrow><mrow><mi mathvariant="italic">R</mi><mi mathvariant="italic">T</mi></mrow></mfrac><mi mathvariant="normal">)</mi></math>
```

FIG. 6

```
<math xmlns="http://www.w3.org/1998/Math/MathML"><apply><eq></eq><ci>D</ci><apply><times></times><apply><selector></selector><ci>D</ci><cn>0</cn></apply><apply><exp></exp><apply><divide></divide><apply><minus></minus><ci>Q</ci></apply><apply><times></times><ci>R</ci><ci>T</ci></apply></apply></apply></apply></apply></math>
```

FIG. 7

```
    <p>5‐6 Factors Affecting Diffusion</p>
    <p class="center"><img/></p>
    <p>Temperature and the Diffusion Coefficient The kinetics of diffusion are stro
    ngly dependent on temperature. The diffusion coefficient <math xmlns="http://
 5  www.w3.org/1998/Math/MathML"><mi mathvariant="italic">D</mi></math> is r
    elated to temperature by an Arrhenius‐type equation,</p>
    <p class="center"><math xmlns="http://www.w3.org/1998/Math/MathML"><mi
    mathvariant="italic">D</mi><mi mathvariant="normal">=</mi><msub><mi mat
    hvariant="italic">D</mi><mrow><mn mathvariant="normal">0</mn></mrow></
10  msub><mi class="unknown_entity" mathvariant="normal">exp</mi><mi math
    variant="normal">(</mi><mfrac><mrow><mo mathvariant="normal">-</mo><
    mi mathvariant="italic">Q</mi></mrow><mrow><mi mathvariant="italic">R</m
    i><mi mathvariant="italic">T</mi></mrow></mfrac><mi mathvariant="normal"
    >)</mi></math> (5‐4)</p>
15  <p>where <math xmlns="http://www.w3.org/1998/Math/MathML"><mi mathvari
    ant="italic">Q</mi></math> is the activation energy (in units of cal/mol) for diff
    usion of the species under consideration (e.g., Al in Si), <math xmlns="http://w
    ww.w3.org/1998/Math/MathML"><mi mathvariant="italic">R</mi></math> is the
    gas constant <math xmlns="http://www.w3.org/1998/Math/MathML"><mi mathv
    ariant="normal">(</mi><mn mathvariant="normal">1</mn><mo mathvariant="
20  normal">.</mo><mn mathvariant="normal">9</mn><mn mathvariant="normal"
    >8</mn><mn mathvariant="normal">7</mn><mfrac><mrow><mi mathvariant="
    normal">c</mi><mi mathvariant="normal">a</mi><mo mathvariant="normal">
    .</mo><mn mathvariant="normal">1</mn></mrow><mrow><mi mathvariant="n
    ormal">m</mi><mi mathvariant="normal">o</mi><mn mathvariant="normal">
25  1</mn><mi mathvariant="normal">K</mi></mrow></mfrac><mi mathvariant="
    normal">)</mi></math> , and <math xmlns="http://www.w3.org/1998/Math/Mat
    hML"><mi mathvariant="italic">T</mi></math> is the absolute temperature (K.
    <math xmlns="http://www.w3.org/1998/Math/MathML"><msub><mi mathvariant
    ="italic">D</mi><mrow><mn mathvariant="normal">0</mn></mrow></msub><
30  /math> is the pre‐exponential term, similar to <math xmlns="http://ww
    w.w3.org/1998/Math/MathML"><msub><mi mathvariant="italic">c</mi><mrow>
    <mn mathvariant="italic">0</mn></mrow></msub></math> in Equation 5&hyp
    hen;1.</p>
    <p><math xmlns="http://www.w3.org/1998/Math/MathML"><msub><mi mathvar
35  iant="italic">D</mi><mrow><mn mathvariant="normal">0</mn></mrow></msu
    b></math> is a constant for a given diffusion system and is equal to the value
    of the dif‐ fusion coefficient at <math xmlns="http://www.w3.org/1998/
    Math/MathML"><mn mathvariant="normal">1</mn><mo mathvariant="normal"
    >/</mo><mi mathvariant="italic">T</mi><mi mathvariant="normal">=</mi><m
40  n mathvariant="normal">0</mn></math> or <math xmlns="http://www.w3.org/1
    998/Math/MathML"><mi mathvariant="italic">T</mi><mi mathvariant="normal"
    >=</mi><mo mathvariant="normal">∞</mo></math>. Typical values for <
    math xmlns="http://www.w3.org/1998/Math/MathML"><msub><mi mathvariant=
    "italic">D</mi><mrow><mn mathvariant="normal">0</mn></mrow></msub></
45  math> are given in Table 5‐1 , while the temperature dependence of <
    math xmlns="http://www.w3.org/1998/Math/MathML"><mi mathvariant="italic">
    D</mi></math> is shown in Figure 5‐12 for some metals and ceramics
    . Covalently bonded materials, such as carbon and silicon (Table 5‐1),
    have unusually high</p>
```

INFORMATION-PROCESSING METHOD, SEARCH SYSTEM, AND SEARCH METHOD

TECHNICAL FIELD

The present invention relates to a search system and a search method using a database, and an information processing method for managing the database, and more particularly, to a search system and a search method capable of being desirably used for reflecting a quantitative relation when searching for a relation among multiple material property parameters, and for creating a database used therefor.

BACKGROUND ART

An objective of prediction and design in material research is to identify substances with target properties. A method widely used to achieve this objective is to identify a substance with target properties by using a condition-property chart. The method involves: observing a change in property upon changing one specific condition among multiple conditions to create a chart, and interpolating or extrapolating the chart to obtain a condition under which the target property is achieved, thereby identifying a substance that fulfills the condition. While the term "chart" used herein is synonymous with a "graph" like a line graph, the term "chart" is hereafter used to distinguish from the later-described "graph" consisting of nodes and edges.

Here, a change in properties upon changing one specific condition among multiple conditions may be obtained by experimenting by oneself in many cases. This is because even if many literatures are searched, a large volume of data with the same condition except for the above specific condition is difficult to obtain.

PTL 1 discloses a search system capable of objectively searching for constituent substance information of a new material with desired properties. The search system disclosed in PTL 1 is provided with a database containing multiple pieces of material property parameter information for each of multiple (many) substances. In the database, some substances may have material property parameters to which no real data is given. Two-dimensional space or three or more-dimensional space is created with a material property parameter to be searched for as one axis and some of the other material property parameters as the other axis (or axes), in which space each of the substances in the database is mapped. Those material property parameters without real data are interpolated with virtual data predicted through multivariate analysis, calculation based on predetermined logical expressions, the first principle calculation, etc. In a search map obtained by mapping real data and virtual data, a substance with desired properties is to be identified based on a predefined rule.

PTL 2 discloses a search system and a search method capable of searching for an unknown combination of material property parameters having a significant relation based on an already known relation from among multiple arbitrary combinations of material property parameters. This search system includes a database, a graph generator and a graph searcher, and is configured as follows. The database stores multiple pairs of mutually related material property parameters. This kind of database is herein referred to as a material property relationship database. The graph generator generates a graph where nodes represent multiple material property parameters stored in the material property relationship database, and edges represent in-between nodes corresponding to the pair of material property parameters stored to have mutual relations. The graph searcher searches for the graph generated by the graph generator under a provided search condition and outputs a search result.

PTL 3 discloses a search system and a search method capable of executing search in consideration of priority. In the disclosed search system and search method, the same material property relationship database as that disclosed in PTL 2 is used to execute path search in a generated graph. In the search system and the search method of PTL 3, relations between material property parameters are weighed in various manner and given as attributes of corresponding edges. Using the attributes, paths to be extracted as a search result is prioritized and the results are output in descending order of priority.

PTL 4 discloses a search system involving: associating a function for correlating two material property parameters with an edge connecting nodes corresponding to the two material property parameters, obtaining a composite function along a path, and displaying how a material property at an end point changes following an increase or decrease in a material property at a start point. In the search system disclosed in PTL 4, a technique is described involving: describing a relation function of cause-side and effect-side material property parameters in Content MathML, and storing the relation function in the same material property relationship database as that disclosed in PTL 2, obtaining a composite function with reference to the stored relation function, and displaying separately the direction and degree of increase/decrease in the material property parameter to reach the effect side when the cause-side material property parameter is changed. Here, the direction and degree of increase/decrease are classified into, for example, increase/decrease linearly, increase/decrease more gradually than linearly, increase/decrease in power, and increase/decrease exponentially.

CITATION LIST

Patent Document

PTL 1: Japanese Patent Application Laid-Open No. 2007-18444
PTL 2: International Publication No. WO 2017/221444
PTL 3: International Publication No. WO2018/159237
PTL 4: Japanese Patent Application Laid-Open No. 2020-021303

SUMMARY OF THE INVENTION

Problems to be Solved by the Invention

The present inventor has studied PTL 1 and PTL 2 and found new problems as follows.

In the technique described in PTL 1, relations among multiple material property parameters are used to predict virtual data, which relations are limited to those already known.

The present inventor has found an issue in which, when search is to be done panoramically across many technical fields, the method of PTL 1 is impractical from the viewpoint of computer performance since the number of material property parameters becomes huge. The present inventor then found that, by mapping relations between material property parameters to the above-described graph, it is possible to extract an unknown but significant relation from among arbitrary combinations regardless of presence/absence of relations thereamong, and proposed the search system and the search method disclosed in PTL 2 and PTL 3 as solutions to PTL 1.

According to the search system and the search method described in PTL 2 and PTL 3, search can be done across most technical fields including every disciplinary mutually less closely related. Therefore, an unknown combination of material property parameters having a significant relation can be extracted. The extraction result may be output in various forms in combination of mutually related cause-side and effect-side material property parameters. The forms may include: multiple paths from a cause-side material property parameter to an effect-side material property parameter, a set of effect-side material property parameters within a predetermined range from a cause-side material property parameter, and conversely, a set of cause-side material property parameters within a predetermined range to an effect-side material property parameter. When, for example, a substance with a target property is to be identified, a user who searches will try to identify a material or a substance, all of whose material property parameters on the path from the cause-side material property parameter to the effect-side material property parameter would satisfy a predetermined specification.

According to the search system and the search method disclosed in PTL 3, the search paths are prioritized in accordance with measurability of material property values, data volume of material property values in the material property relationship database, material property values, etc., which is significantly effective for users to identify a desired or the optimum material property control path. The disclosed search system and the search method, however, is not sufficient due to lack of information of the increase and decrease or the degree of increase/decrease of the material property parameters included in the paths.

As described above, the search systems disclosed in PTLs 2 and 3 focuses merely on presence/absence of a relation (causal relation) among material properties, and cannot process relations among multiple material property parameters by defining a relation thereamong with equations and functions. The search system disclosed in PTL 4 can process a quantitative relation among material properties. For that purpose, it is ideal that all the pairs of material property parameters are stored comprehensively in the material property relationship database. However, creation of a comprehensive database by manpower takes huge time and cost. Furthermore, the fact that only those with expertise can only do this work is also an impediment to create a database. This is because while textbooks, etc. have a huge amount of description in which relations among material properties are associated by equations and functions, such knowledge existing in huge amount of technical fields can be extracted only by experts having detailed knowledge of the huge amount of technical fields.

Then, the present inventor has invented a technique of extracting a relation between material property parameters written in an input textbook document by reading the textbook document, executing natural language processing, and executing deep learning. The technique was filed as Japanese Patent Applications No. 2018-194117 and No. 2019-125841.

With this method, a pair of material property parameters having a causal relation to be stored in the material property relationship database can be extracted without manpower, which significantly reduces manhour otherwise required for the creation of a database. However, manpower by experts is still required for the quantitative relations between material properties. The relations between material property parameters are often described by relational formulae as well as described in sentences (natural languages) in textbook documents, and descriptions by relational formulae are stricter. Further, the number of material property parameters defined by one relational formula is not limited to two. In many cases, three or more material property parameters are involved in one relational formula. Therefore, the operation of storing relational functions correlating two material property parameters in the material property relationship database should be done by experts.

An objective of the invention is to provide a method of extracting a relational formula that associates two material property parameters, regardless of presence/absence of relations therebetween, from a textbook document using a computer, and storing the extracted relational formula in a material property relationship database. Another objective is to provide a search system for searching in consideration of quantitative relations among material properties using a material property relationship database where relational formulae between material property parameters having a causal relation are input.

Means for Solving the Problem

An aspect of the invention is as follows.

An information processing method for inputting a relational formula indicating a relation between two material property parameters constituting a pair of material property parameters in a material property relationship database that stores pairs of mutually related material property parameters. The method is configured as follows.

Equation information indicating a relational formula is extracted from read input data, and multiple variables constituting the relational formula and a relational formula that defines the relation are extracted from the equation information. Further, description that defines each of the multiple variables is extracted from the input data, and each variable is associated with a material property parameter with reference to the material property relationship database. The extracted relational formula is input in the material property relationship database in association with the pair of material property parameters corresponding to two of the multiple variables constituting the relational formula.

Effect of the Invention

The effect to be obtained by the above aspect will be briefly described.

That is, a method is provided of extracting a relational formula that associates two material property parameters from a textbook document using a computer, and storing the extracted relational formula in a material property relationship database. Further, a search system is provided for searching in consideration of quantitative relations between material properties using a material property relationship database where relational formulae between material property parameters having causal relations are input.

BRIEF DESCRIPTION OF THE DRAWINGS

FIG. 1 is a flowchart illustrating an exemplary configuration of an information processing method according to a first embodiment.

FIG. 2 is an explanatory diagram illustrating an exemplary configuration of a material property relationship database.

FIG. 3 is an explanatory diagram illustrating exemplary input data including a relational formula of a material property.

FIG. 4 is an explanatory diagram illustrating an image of a relational formula area extracted from the input data of FIG. 3.

FIG. 5 is an explanatory diagram illustrating an example where a relational formula extracted from image information illustrated in FIG. 4 is described in Presentation MathML (Mathematical Markup Language). Equation information included in electronically published textbooks, etc., is described in the same format.

FIG. 6 is an explanatory diagram illustrating an example where a relational formula described in Presentation MathML as in FIG. 5 has been transformed into and described in Content MathML.

FIG. 7 is an explanatory diagram illustrating text data transformed from the input data in PDF format illustrated in FIG. 3 into XHTML format through optical character recognition.

DETAILED DESCRIPTION OF THE INVENTION

1. Outline of Embodiments

Figure 8:
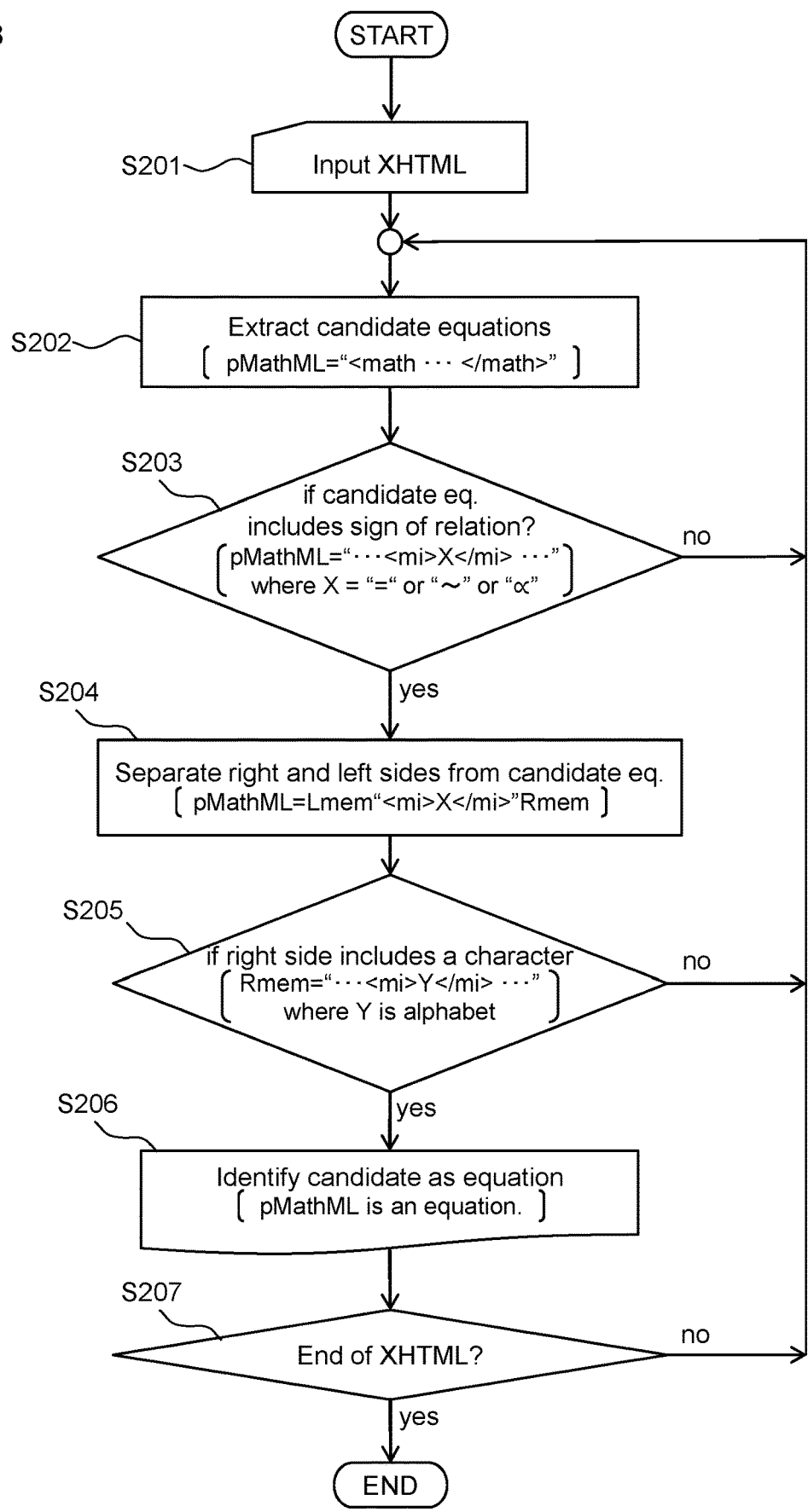
FIG. 8 is a flowchart illustrating an exemplary method of selecting data to be determined as equations out from among the extracted text data in Presentation MathML.

First, an outline of a representative embodiments disclosed in the present application will be described. Reference signs in the drawings referred to in the parentheses in the description of the outline of the representative embodiments are merely illustrative of those included in concept of constituent elements to which reference is made.

[1]<Information Processing Method for Extracting and Recognizing Relational Formula to be Input in Material Property Relationship Database>

A representative embodiment of the invention is an information processing method using a computer provided with a storage device. The method is configured as follows.

The information processing method involves inputting a relational formula representing a relation between two material property parameters constituting a pair of material property parameters in a material property relationship database (1) that stores pairs of mutually related material property parameters. The method includes the following steps (FIG. 1).

1st step (S1): read input data.
2nd step (S2): extract equation information indicating a relational formula from the input data.
3rd step (S3): extract, from the equation information, multiple variables constituting the relational formula and a relational formula defining a relation between the multiple variables.
4th step (S4): extract description defining each of the multiple variables from the input data.
5th step (S5): associate each of the multiple variables with a material property parameter stored in the material property relationship database with reference to the material property relationship database, based on the description defining each of the multiple variables extracted in the 4th step.
6th step (S6): feed the relational formula into the material property relationship database in association with the pair of material property parameters corresponding to two of the multiple variables.

Thus, a method is provided of extracting a relational formula that associates two material property parameters from a textbook document using a computer and storing the extracted relational formula in a material property relationship database. By using this method, a search system is further provided for searching in consideration of quantitative relations between material properties using a material property relationship database where relational formulae between material property parameters having causal relations are input.

[2]<Cause-Side and Effect-Side Material Property Parameters>

In the information processing method of [1], the pair of material property parameters is made by a cause-side material property parameter and an effect-side material property parameter. In the 6th step the relational formula is input in the material property relationship database in association with a pair of material property parameters whose effect-side material property parameter is the material property parameter that corresponds to the variable calculated by the relational formula.

In this manner, those cases where a relation of an inverse function is established between two material property parameters and where is not can be processed separately.

[3]<Derivation of Relational Formula for Calculating Cause-Side Material Property Parameter>

Figure 9:
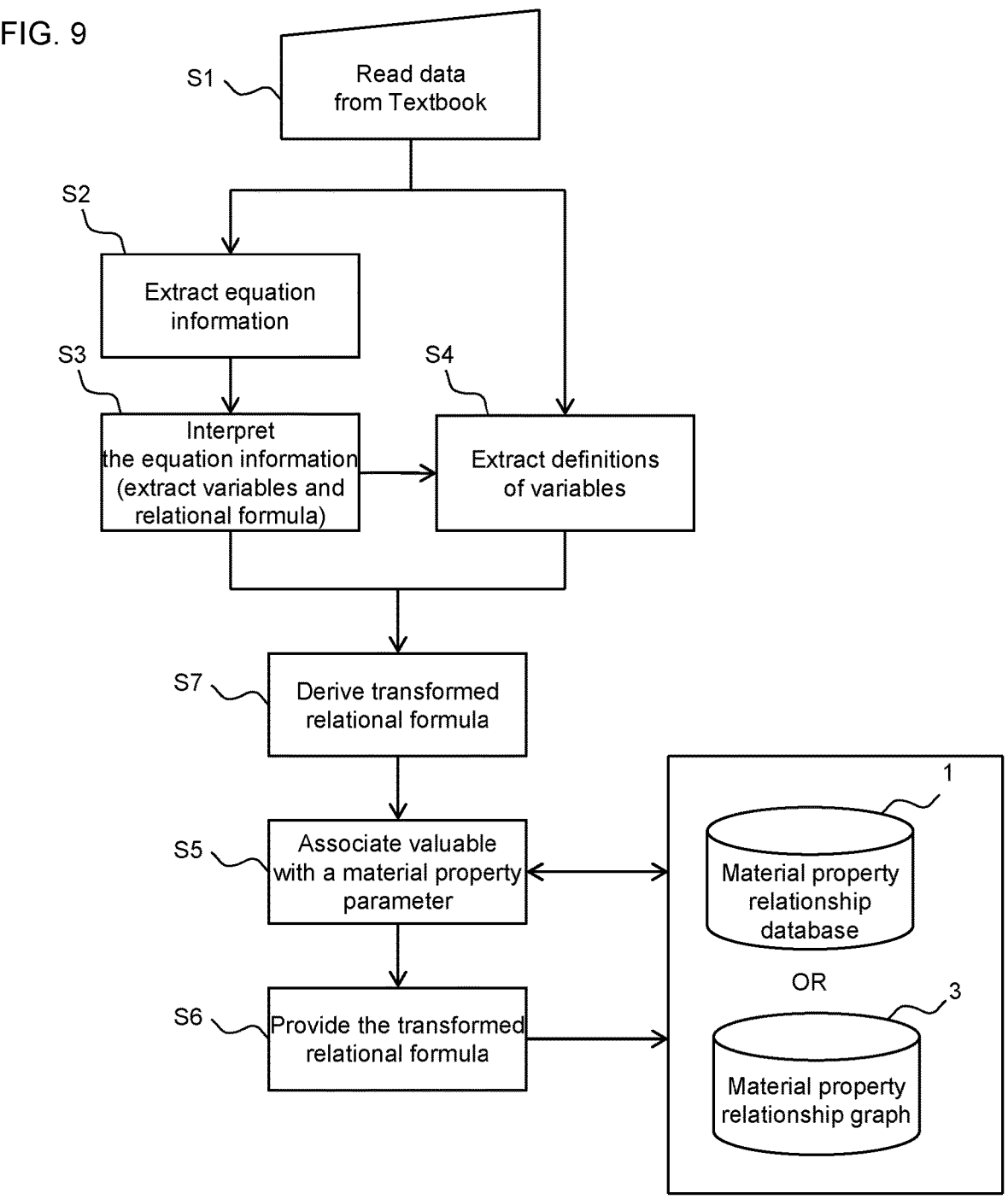
FIG. 9 is a flowchart illustrating a modification of the information processing method according to the first embodiment.

The information processing method of [2] further includes a 7th step (S7) of deriving, from the relational formula, a transformed relational formula for calculating a variable other than the variable calculated by the relational formula. In the 6th step, the transformed relational formula is input in the material property relationship database in association with a pair of material property parameters whose effect-side material property parameter is the material property parameter that corresponds to the variable calculated by the transformed relational formula (FIG. 9). More specifically, in the 7th step (S7), when a variable obtained from the relational formula is the left side, among each of the variables included on the right side, a variable representing a material property parameter is transformed into a relational formula for which the variable (set to the left side) is to be obtained. The transformed relational formula is input in the material property relationship database in association with a proper pair of material property parameters with a material property parameter corresponding to the variable on the left side as the effect-side material property parameter from among pairs of material property parameters stored in the material property relationship database.

In this manner, also regarding those variables that are not direct calculation targets in relational formulae extracted from input textbook, etc., relational formulae for obtaining corresponding material property parameters are input in the material property relationship database by a computer, reducing manhour.

[4]<Extract Condition for Satisfying Relational Formula>

Figure 10:
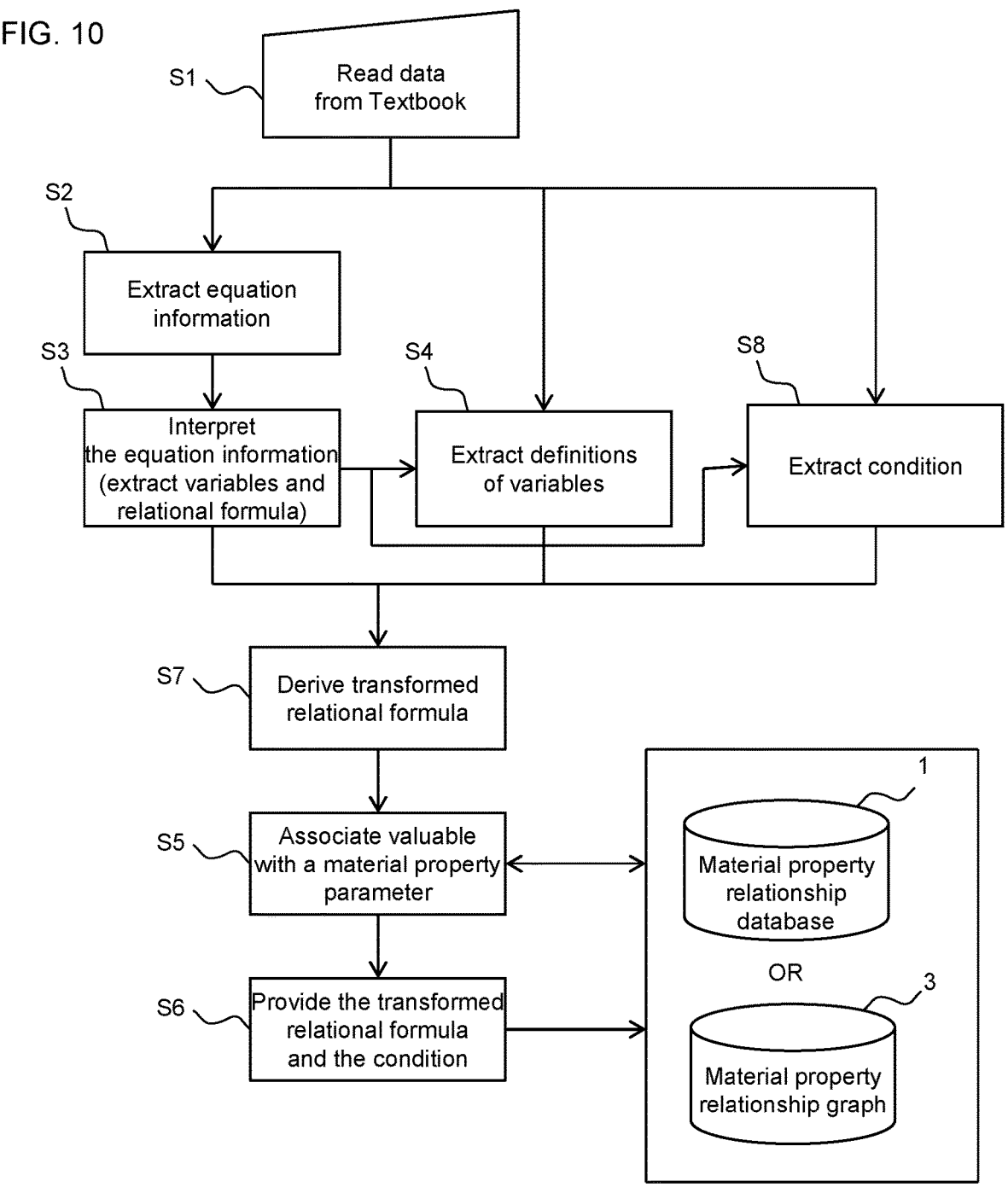
FIG. 10 is a flowchart illustrating another modification of the information processing method according to the first embodiment.

The information processing method of any one of [1] to [3] further includes: an 8th step (S8) of extracting a condition under which a relational formula is satisfied from the input data. In the 6th step, the condition is input in the material property relationship database in association with a pair of material property parameters including a material property parameter that corresponds to a variable calculated by the relational formula (FIG. 10).

In this manner, a material property relationship database capable of being used in a search system that can properly process relations established under some conditions can be created with reduced manhour.

[5]<Processing of Different Conditions>

In the information processing method of [4], in the 6th step, when another condition is already associated with the pair of material property parameters to be associated with the condition in the material property relationship database, a record corresponding to the pair of material property parameters is copied and the condition is input.

A record herein is configured to include one relational formula corresponding to one pair of material property parameters, and one condition corresponding thereto. The material property relationship database is constituted by multiple records. When there are different relational formulae that are satisfied under different conditions for the same pair of material property parameters, the relations are stored in the material property relationship database using multiple records.

In this manner, a material property relationship database capable of being used in a search system that can properly process relations satisfied under various conditions can be created with reduced manhour.

[6]<Determination of Dependent Variable and Derivation of Relational Formula>

The information processing method of any one of [1] to [5] further includes:9th step (S9) of determining whether each of the multiple variables extracted in the 3rd step is an independent variable or a dependent variable based on the material property relationship database, 10th step (S10) of generating a dependent variable relational formula for calculating the dependent variable when the extracted variable is a dependent variable, and 11th step (S11) of displaying the dependent variable relational formula.

In this manner, dependent variables can be processed properly in the material property relationship database and in the search system using the database.

[7]<Collation with Already Input Relational Formula>

The information processing method of any one of [1] to [6] further includes 12th step of collating the relational formula with another relational formula when the another relational formula is already stored in the material property relationship database in association with a pair of material property parameters including a material property parameter that corresponds to a variable calculated by the relational formula extracted in the 3rd step.

In this manner, reliability of the material property relationship database and the search system using the database can further be enhanced. There may be a case where a relational formula extracted from input data of one textbook, etc. is different from a relational formula extracted from input data of another textbook, etc. Such inconsistency is supposed to arise when, for example, textbooks are based on various environments (conditions) under which relational formulae are satisfied. In the information processing method of the invention, such inconsistency problem may be addressed by, for example, a user collating the relational formula already stored in the material property relationship database with a relational formula to be newly extracted and input. Therefore, reliability of the material property relationship database and the search system using the database can further be enhanced.

[8]<Search System Displaying Relational Formula Along Path of Search Result>

Figure 12:
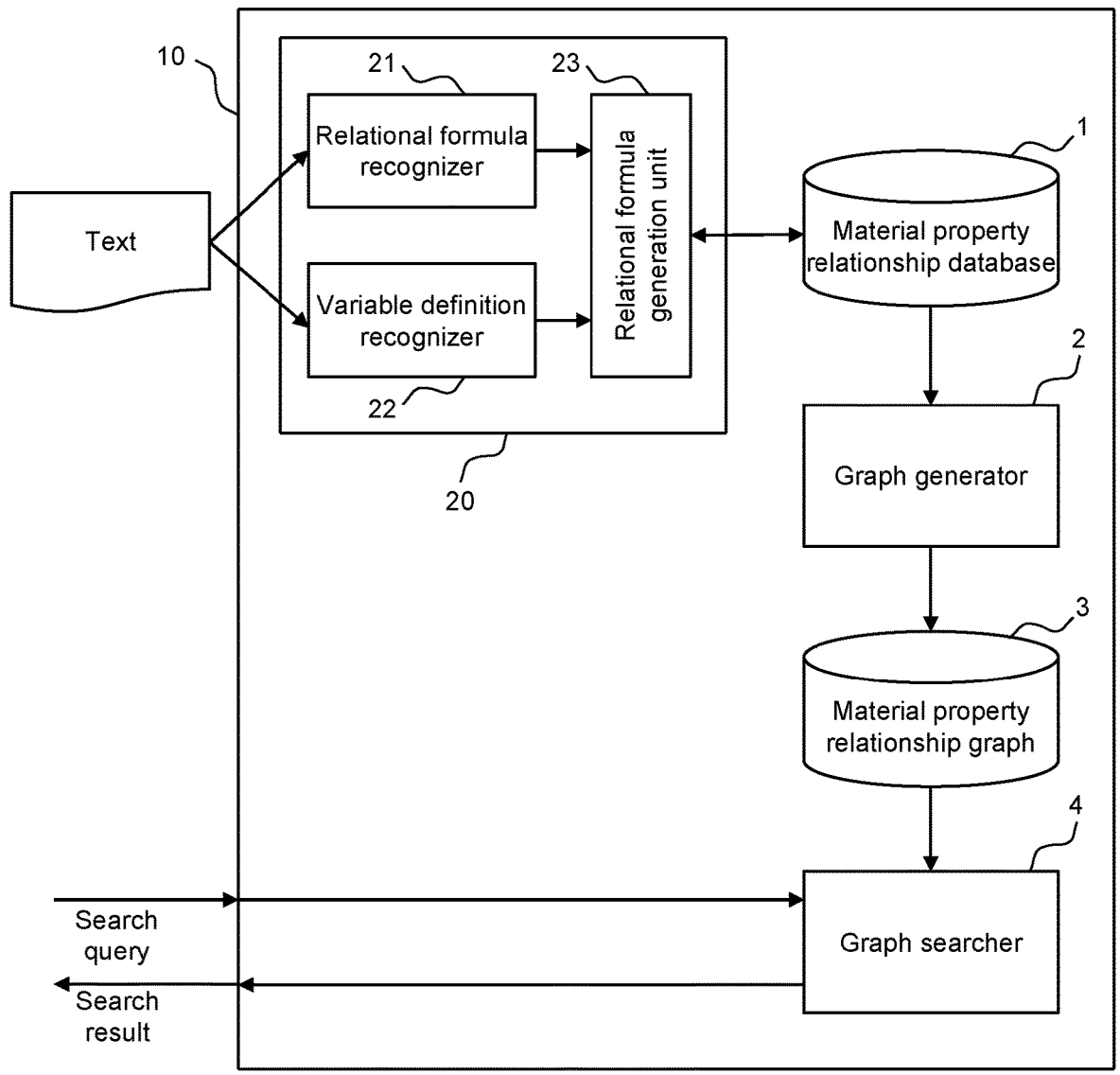
FIG. 12 is a block diagram illustrating an exemplary configuration of a search system according to a second embodiment.

A representative embodiment of the invention is a search system (10) including a material property relationship database (1), a graph generator (2) and a graph searcher (4). The system is configured as follows (FIG. 12).

The material property relationship database stores, in association with each other, a pair of mutually related material property parameters, and a relational formula for calculating a value of one of the pair of material property parameters using a value of the other of the pair.

The graph generator is configured capable of generating a graph (3) where nodes represent multiple material property parameters included in the pair of material property parameters, and edges represent in-between nodes corresponding to the pair of material property parameters. The graph searcher is configured capable of executing path search in the graph under given search conditions, and outputting a path as a search result together with a relational formula corresponding to edges included in the path.

The search system further includes a relational formula extractor (20) that extracts a relational formula between material property parameters having a causal relation from input data of a textbook, etc., and inputs the extracted relational formula in the material property relationship database. The relational formula extractor (20) is configured to include, for example, a relational formula recognizer (21), a variable definition recognizer (22) and a relational formula generation unit (23). The relational formula recognizer (21) recognizes and extracts equation information indicating relational formulae included in the input data. The variable definition recognizer (22) extracts description that defines a variable from sentences included in the same input data. The relational formula generation unit (23) associates a material property parameter stored in the material property relationship database (1) with the variable based on the recognized variable definition, and feeds the extracted relational formula as the relational formula into the material property relationship database.

In this manner, a search system is provided for searching in consideration of quantitative relations between material properties using a material property relationship database where relational formulae between material property parameters having causal relations are input. Further, with the relational formula extractor that extracts a relational formula from a textbook, etc., and inputs the extracted relational formula in the material property relationship database, the material property relationship database is managed more easily.

The relational formula recognizer (21), the variable definition recognizer (22) and the relational formula generation unit (23) are configuration to execute operations equivalent to the 1st to 6th steps described in [1]. The search system may further include configuration for executing operation equivalent to each step described in [2] to [7].

[9]<Condition for Satisfying Relational Formula>

In the search system of [8], the material property relationship database stores a condition under which the relational formula is satisfied in association with the relational formula, and in the graph, the condition is given as an attribute to an edge corresponding to the relational formula.

In this manner, relations established under some conditions can be processed properly.

<Relational Formulae Having Different Conditions to Satisfy the Formulae for Same Pair of MATERIAL Property Parameters>

In the search system of [8] or [9], the material property relationship database is configured capable of storing multiple relational formulae to be satisfied under different conditions for the same pair of material property parameters, and the graph generator generates, in the graph, multiple edges with which the multiple relational formulae to be satisfied under different conditions are associated individually between nodes corresponding to the pair of material property parameters.

In this manner, relations established under various conditions can be processed properly.

<Calculation of Composite Function>

In the search system of any one of [8] to [10], the graph searcher is configured capable of composing relational formulae corresponding to the multiple edges for the path included in the search result and constituted by multiple edges and outputting composed formula.

With this configuration, regarding a relation between material property parameters defined via multiple material property parameters, a quantitative relation along a path can be processed properly and easily.

<Material Property Search System That Can Reflect Contribution of Influencing Factors>

The search system (10) of any one of [8] to [11] further includes an influencing factor database (5), an influence determiner (6) and a search result output unit (7).

The influencing factor database stores, in association with one another, at least one material property parameter among the multiple material property parameters, one or more influencing factors on which the material property parameter has dependence, and a relational formula indicating the dependence.

The relational formula generation unit further associates the influencing factor stored in the influencing factor database with the variable based on the recognized variable definition, and inputs the extracted relational formula in the influencing factor database as the relational formula.

The influence determiner is configured to determine whether the material property parameter corresponding to the node included in the search result is dependent on at least one influencing factor by referring to the influencing factor database. The search result output unit is configured to output, together with the search result, a combination of the material property parameter and the influencing factor determined by the influence determiner to have dependence, and the relational formula thereof.

With this configuration, in a material property search system that searches for a graph where pairs of related material property parameters are associated with pairs of nodes connected by edges, a search support function that enables the influence of factors of not material properties (influencing factors) to be reflected on the search can be provided. When a material property parameter depending on some influencing factor is included in the search result, a relational formula where the material property parameter represents the dependence can be output together with the search result. Therefore, the user can more efficiently extract a substance or a material having a target property, or a method for producing the same from the search result.

<Search Method Displaying Relational Formula Along Path of Search Result>

Figure 13:
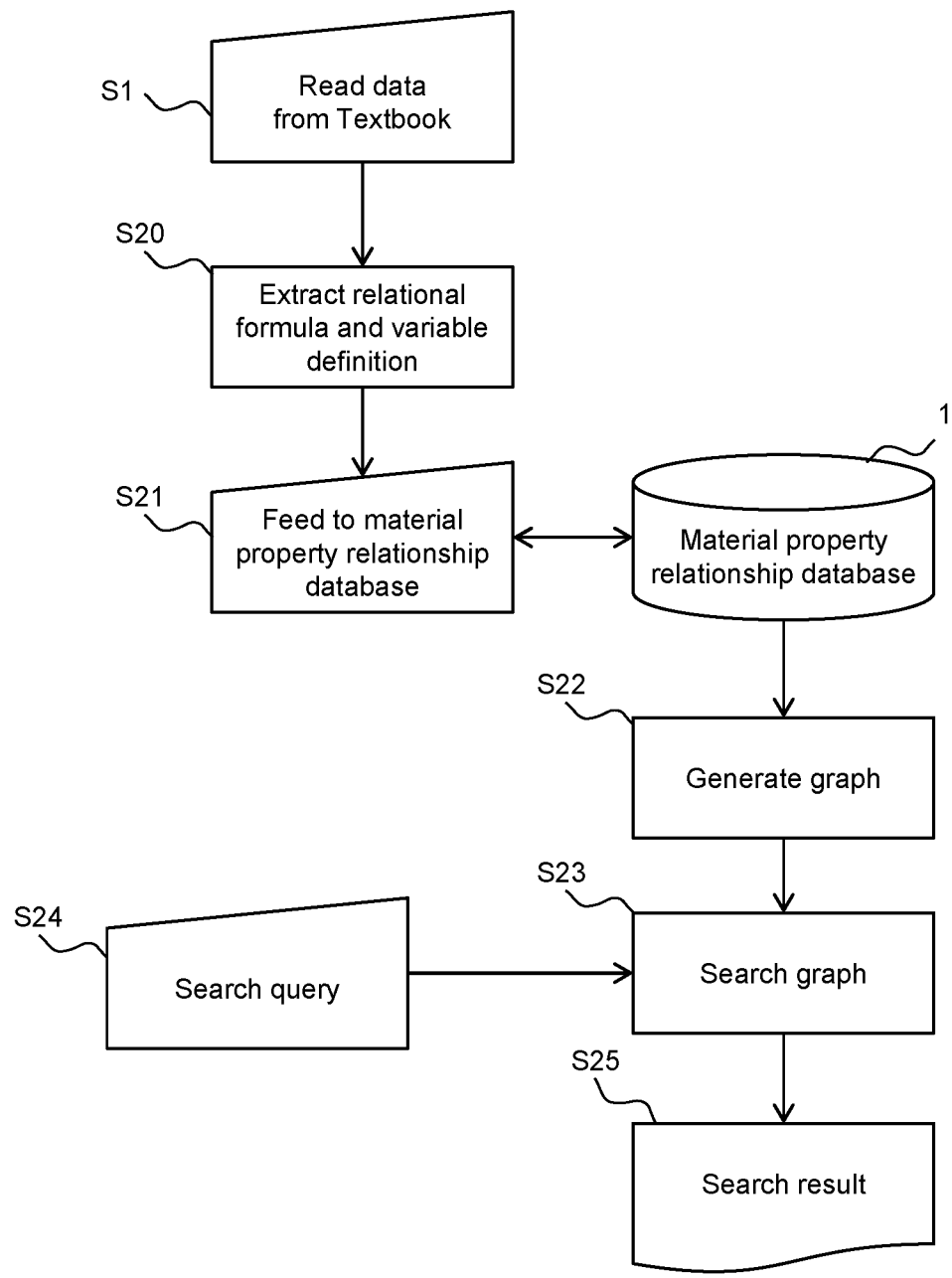
FIG. 13 is a flowchart illustrating an exemplary configuration of a search method according to the second embodiment.

A representative embodiment of the invention is a search method that uses a computer provided with a storage device and refers to a material property relationship database stored in the storage device. The method includes a relational formula/variable definition extraction step (S20), a material property relationship database input step (S21), a graph generation step (S22), and a graph search step (S23), and is configured as follows (FIG. 13).

The material property relationship database (1) is configured by storing, in association with each other, a pair of mutually related material property parameters, and a relational formula for calculating a value of one of the pair of material property parameters using a value of the other of the pair in the storage device.

In the relational formula/variable definition extraction step, a relational formula and variable definition contributing to the relational formula are extracted from the input data of the textbook, etc. In the material property relationship database input step, the extracted variable is associated with the material property parameter stored in the material property relationship database (1) based on the variable definition thereof, and the extracted relational formula is input in the material property relationship database.

In the graph generation step, a graph is generated where nodes represent multiple material property parameters included in the pair of material property parameters, and edges represent in-between nodes corresponding to the pair of material property parameters. In the graph search step, path search in the graph is executed under given search conditions (S24), and a path is output as a search result together with a relational formula corresponding to edges included in the path (S25).

In this manner, a search method is provided for searching in consideration of quantitative relations between material properties using the material property relationship database where relational formulae between material property parameters having a causal relation are input. Further, with the relational formula/variable definition extraction step, management of the material property relationship database becomes easy.

The relational formula/variable definition extraction step (S20) and the material property relationship database input step (S21) are configuration to execute operations equivalent to the 1st to 6th steps described in [1]. The search system may further contain or include configuration for executing operation equivalent to each step described in [2] to [7].

<Condition for Satisfying Relational Formula>

In the search method of [13], the material property relationship database stores a condition under which the relational formula is satisfied in association with the relational formula, and in the graph, the condition is given as an attribute to the edge corresponding to the relational formula.

In this manner, relations established under some conditions can be processed properly.

<Relational Formulae Having Different Conditions to Satisfy the Formula for Same Pair of Material Property Parameters>

In the search method of [13] or [14], the material property relationship database is configured capable of storing multiple relational formulae to be satisfied under different conditions for the same pair of material property parameters, and in the graph generation step, multiple edges are generated, in the graph, with which the multiple relational formulae to be satisfied under different conditions are associated individually between nodes corresponding to the pair of material property parameters.

In this manner, relations established under various conditions can be processed properly.

<Calculation of Composite Function>

In the search method of any one of [13] to [15], in the graph search step, relational formulae corresponding to the multiple edges are composed and a composed formula is output for a path included in a search result and constituted by multiple edges.

With this configuration, regarding a relation between material property parameters defined via multiple material property parameters, a quantitative relation along a path can be processed properly and easily.

<Material Property Search System That Can Reflect Contribution of Influencing Factors>

The search method of any one of [13] to [16] further includes: an influence determination step of referring to the influencing factor database (5) stored in the storage device or another storage device (112, 122 in FIG. 14), and a search result output step.

Figure 16:
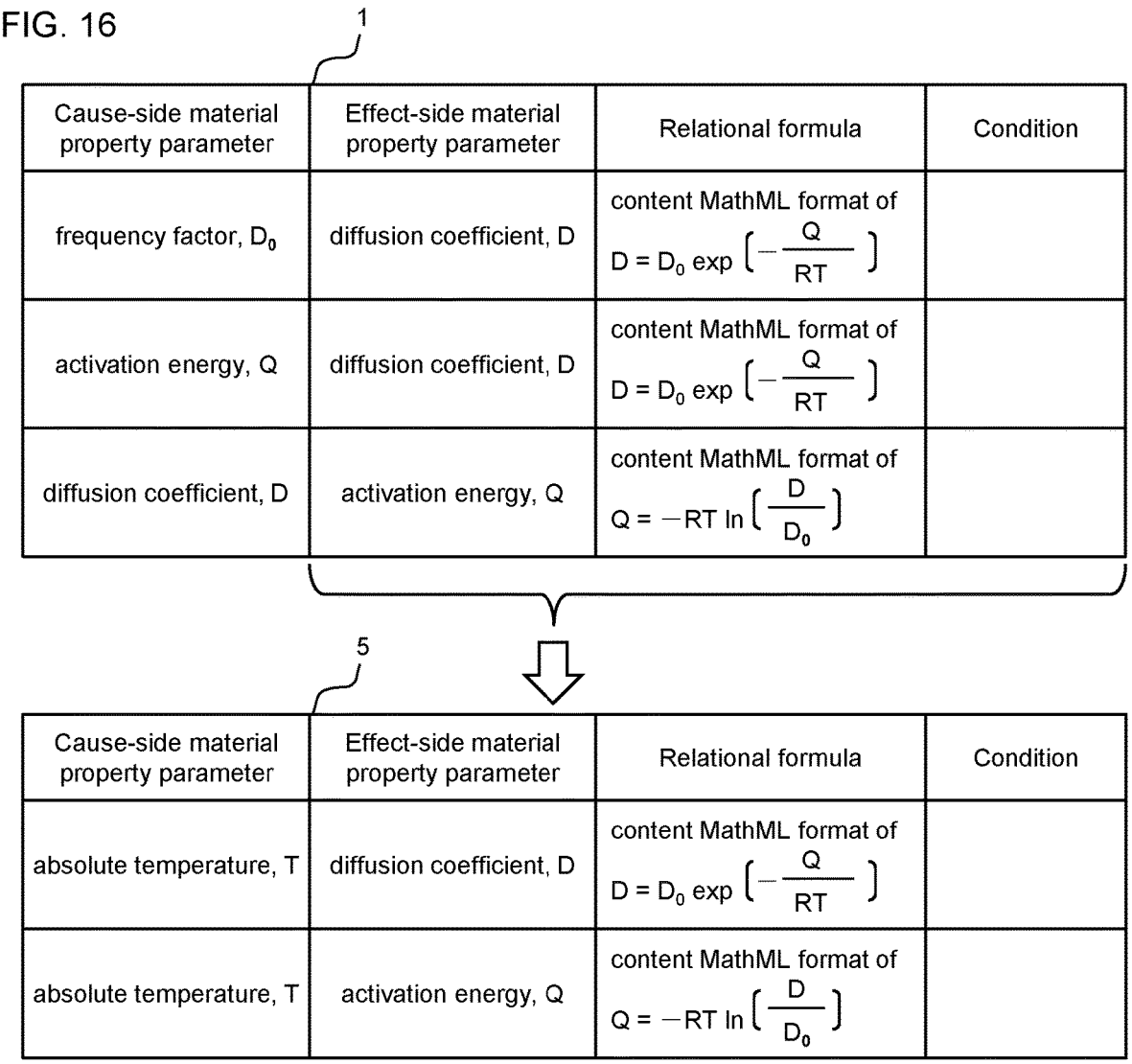
FIG. 16 is an explanatory diagram illustrating a relation between a material property relationship database 1 and an influencing factor database 5.

In the influencing factor database, at least one material property parameter among the multiple material property parameters, one or more influencing factors on which the material property parameter has dependence, and a relational formula indicating the dependence are associated with one another (FIG. 16).

In the material property relationship database input step, further, the influencing factor stored in the influencing factor database is associated with the variable based on the variable definition recognized in the relational formula/variable definition extraction step and, the extracted relational formula is input in the influencing factor database as the relational formula.

In the influence determination step, whether the material property parameter corresponding to the node included in the search result is dependent on at least one influencing factor is determined. In the search result output step, a combination of a material property parameter and an influencing factor determined in the influence determination step to have dependence, and the relational formula thereof are output together with the search result.

With this configuration, also in a material property search method for searching for a graph where a pair of related material property parameters is associated with a pair of nodes connected by edges, as in [12], a search support function that enables the influence of factors of not material properties (influencing factors) to be reflected on the search can be provided.

2. Details of the Embodiments

The embodiments will be described in more detail.

First Embodiment

FIG. 1 is a flowchart illustrating an exemplary configuration of an information processing method according to a first embodiment.

The first embodiment is an information processing method using a computer provided with a storage device, and is configured as follows.

The information processing method of the present embodiment is a method of inputting, in the material property relationship database 1 that stores a pair of mutually related material property parameters, a relational formula indicating a relation between a pair of material property parameters stored to have a causal relation. The method includes the following steps. The material property relationship database 1 is constituted by multiple records each including one pair of mutually related material property parameters (the same applies to other embodiments).

1st step (S1): read input data. The input data desirably is a document such as a textbook whose content has been scrutinized and recognized to be accurate. The input data includes sentences as information for displaying text data, figures and equations. The input data herein may include documents printed on paper such as books, documents published electronically in various formats like Portable Document Format (PDF) and Electronic PUBlication (ePUB), and description on the web accessible from the Internet. "Information for displaying equations" may be information indicating an external structure of content to be displayed, and may include information in image formats like bitmap, tagged image file format (tif) and joint photographic expert group (jpeg), and information written in those languages as TEX, LATEX and Presentation MathML. The invention, however, is not limited to those mentioned above. When the document is a printed matter like a book, images obtained by capturing each page undergo character recognition so that sentences recognized as characters constitute text data and the rest constitutes image information of input data. When the document is in PDF format, the input data is constituted by text data and image information in many cases. When the input data is an electronically published book, etc., the data is described in XHTML format such as ePUB in many cases, and when the input data is description on the web accessible from the Internet, the data is described in HTML or XHTML format in many cases. In either case, the input data includes text data representing sentences and information for displaying figures and tables.

2nd step (S2): extract equation information indicating a relational formula from the input data. When a relational formula is included in the equation information, an area representing the relational formula is extracted. When the input data is description on the web, the entire input data is described in the format of HTML, XHTML, etc., and the relational formula is described in Presentation MathML in many cases. Also when the input data is an electronically published book, etc. in ePUB format, the relational formula is described in Presentation MathML in many cases.

3rd step (S3): from the extracted equation information, extract a relational formula described therein and multiple variables constituting the relational formula. When the equation information is an image, commercially available recognition software such as InftyReader may be used to extract a relational formula from the image information. InftyReader can output, from an input PDF file, a file in XHTML format including text information indicating sentences and description in Presentation MathML, etc., indicating equations, etc., through character recognition. When the input data is description on the web or a book in ePUB format and the relational formula is described in Presentation MathML, the data at this stage will be in the same format. The extracted relational formula is transformed into a form representing a quantitative relation. For example, since Presentation MathML described above is not the format representing a quantitative relation though being a descriptive format, it is desirable to transform Presentation MathML into Content MathML for representing a quantitative relation. Such conversion may be executed by using existing software tools.

4th step (S4): extract description defining each of multiple variables from the input data. Relational formulae usually include signs indicating material property parameters. In the 2nd step (S2), variables used in the extracted relational formula are also extracted. In the 4th step, the text data extracted from the input data is traced back from the vicinity of the relational formula extracted in the 3rd step to search for the place where each variable used in the extracted relational formula is defined. Variable definition is usually given immediately before or after relational formulae, or at the beginning of a chapter, section or document, etc. Therefore, variable definition can be found and extracted by search tracing back from the vicinity of relational formulae.

5th step (S5): associate each of the variables used in the extracted relational formula with a material property parameter stored in the material property relationship database 1 with reference to the material property relationship database 1, based on the variable definition extracted in the 4th step.

6th step (S6): feed the relational formula into the material property relationship database 1 in association with the pair of material property parameters corresponding to two of the multiple variables used in the extracted relational formula.

The type of the database is not limited to that of the material property relationship database 1. For example, the material property relational graph 3 described in detail later may be integrally used as a network (or graph) database. The extracted relational formula is associated with the corresponding node as an attribute thereof.

Thus, a method is provided of extracting a relational formula that associates two material property parameters from a textbook document using a computer and storing the extracted relational formula in a material property relationship database. By using this method, a search system is further provided for searching in consideration of quantitative relations between material properties using a material property relationship database where relational formulae between material property parameters having causal relations are input. The information processing method of the present embodiment is constructed to function as software on a hardware system (a computer system where one or more computers are connected via a network) provided with a storage device and a processor as described later in "Hardware/Software Implementation".

An example of the information processing method of the present embodiment will be described.

FIG. 2 is an explanatory diagram illustrating an exemplary configuration of a material property relationship database 1. The upper part of the drawing illustrates an example before the relational formula is input in the 1st to 6th steps, the middle part is an example after the relational formula is input, and the lower part is an example after the transformed relational formula is input. While only a few pairs of material property parameters are illustrated, storing as many pairs of material property parameters as possible is desirable in practice. The material property relationship database is configured to be capable of storing, for each record, cause-side and effect-side material property parameters that constitute a pair of material property parameters having a mutual causal relation, a relational formula indicating the relation between the two material property parameters, and a condition under which the relational formula is completed. Each row of the material property relationship database in the table of FIG. 2 corresponds to a single record.

The material property relationship database 1 needs to store multiple pairs of material property parameters having a mutual causal relation, while relational formulae and conditions need not necessarily be in storage. Here, pairs of material property parameters having mutual causal relations are not limited to relations based on scientific evidence, i.e., theoretically explained relations: those known to have causal relations due to obvious correlation found therebetween from experimental data may also be included in the pairs of material property parameters even if theoretical explanation or even formulation has yet to be done. This is because when only the fact that there is a causal relation between a pair of material property parameters is stored, it is possible to know presence/absence of any causal relation between arbitrary material property parameters or to search for a path that may cause a relation as described in PTLs 2 and 3.

Presence of a causal relation is stored, but no relational formulae and or conditions are stored in each record of the material property relationship database 1 at the upper part of FIG. 2. FIG. 2 illustrates three records showing presence of causal relations among three material property parameters of diffusion coefficient D, frequency factor Do and activation energy Q. It is common technical knowledge that diffusion coefficient D is obtained from the values of frequency factor Do and activation energy Q. When an inverse relation, e.g., a direction in which activation energy Q is calculated from diffusion coefficient D is not general, a record where diffusion coefficient D is the cause-side material property parameter and activation energy Q is the effect-side material property parameter may not be included unlike the third row at the upper part of FIG. 2. However, since the relation where activation energy Q is calculated from diffusion coefficient D is useful in many cases, it is more desirable for the database to include a record where diffusion coefficient D is the cause-side material property parameter and activation energy Q is the effect-side material property parameter. Furthermore, as will be described later in "Derivation of Relational Formula for Calculating Cause-Side Material Property Parameter", it is further desirable to derive a relational formula for calculating activation energy Q on the cause-side in the second row through equation transformation and input the generated relational formula in the relational formula field in the third row. Note that the terms "cause-side" and "effect-side" do not necessarily represent the cause and effect in physical mechanisms, but represent the right and left sides of equations.

In the 1st step (S1), input data is read from a textbook. FIG. 3 is an explanatory diagram illustrating an exemplary input data including a relational formula of a material property. While actual input data includes a lot of relational formulae and sentences, only a part of the input data including a single relational formula is illustrated in FIG. 3. Sentences are illustrated as image data, but are desirably input as text data if possible. When sentences are input as image data, the image data is transformed into text data through optical character recognition (OCR).

Figure 4:
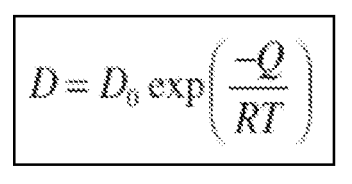

In the 2nd step (S2), equation information indicating a relational formula is extracted from the input data. In this example, the relational formula is included in the image information, so the area of the relational formula is extracted. FIG. 4 is an explanatory diagram illustrating an image of a relational formula area extracted from the input data of FIG. 3.

In the 3rd step (S3), from the image information extracted in the 2nd step (S2), the relational formula described therein and multiple variables constituting the relational formula are extracted. FIG. 5 is an explanatory diagram illustrating an example where a relational formula extracted from image information illustrated in FIG. 4 is described in Presentation MathML (Mathematical Markup Language). When the input data is description on the web or a book in ePUB format, and the relational formula is described in Presentation MathML, the data is in the same format. FIG. 6 is an explanatory diagram illustrating an example where a relational formula has been transformed into Content MathML and described in it. Presentation MathML is a descriptive language for describing equations, and describes positions to display, format like font, italic and bold, superscript, subscript, etc., except for details of arithmetic operations. Content MathML is a descriptive language for describing details of arithmetic operations, and may include signs indicating equality, inequality and parentheses, arithmetic operations such as addition, subtraction, multiplication, division and exponentiation, and functions such as exp and ln. In the 3rd step (S3), variables D, $D_0$, Q, R and T are extracted from Presentation MathML illustrated in FIG. 5 or Content MathML illustrated in FIG. 6.

In the 4th step (S4), description defining each of the variables D, Do, Q, R and T extracted in the 3rd step (S3) is extracted from the input data. Specifically, what material property parameter each variable is indicating is extracted from a sentence whose meaning has been understood through natural language processing on text data included in the input data. From the input data illustrated in FIG. 3, description each defining that variable D is a diffusion coefficient, variable $D_0$ is a frequency factor, variable Q is activation energy, variable R is a gas constant, and variable T is absolute temperature is extracted. From the sentence "The diffusion coefficient D is related to . . . " immediately before Equation 5-4, it is known the variable D represents a diffusion coefficient. From the sentence "where Q is the activation energy . . . R is gas constant . . . and T is the absolute temperature" after Equation 5-4, it is known that the variables Q, R, and T represent activation energy, a gas constant, and absolute temperature, respectively. From the next sentence "$D_0$ is the pre-exponential term" and the sentence at the beginning of the next paragraph "Do is a constant for a given diffusion system and is equal to the value of the diffusion coefficient at 1/T=0 or T=∞.", it is known that the variable Do represents a frequency factor. Although names of material property parameters cannot be extracted directly from those sentences given as examples, accurate names of material property parameters can be associated through natural language processing using dictionaries where meanings of technical terms are defined. If natural language processing is insufficient or if natural language processing cannot be used, the extracted sentences may be displayed to the user for judgment so that the user can complement the association.

In the 5th step (S5), each of the variables used in the extracted relational formula is associated with a material property parameter stored in the material property relationship database 1 with reference to the material property relationship database 1, based on the variable definition extracted in the 4th step. Since diffusion coefficient, frequency factor and activation energy are stored in the material property relationship database 1 illustrated in FIG. 2 as the cause-side or the effect-side material property parameters, these parameters are associated with the extracted variables D, $D_0$ and Q, respectively. Gas constant represented by variable R is a physical constant and is not stored as a material property parameter in the material property relationship database 1 as well as absolute temperature T.

In FIG. 2, the same variables used in the textbook, which is the input data, are used for example, where in the 5th step (S5), association is made based not on whether the variables are the same or different but on specific names of the material property parameters. Inconsistency in expression of names of material property parameters is absorbed at this stage. A synonym dictionary of names of material property parameters is provided for this purpose, to which reference is made to absorb inconsistency in expression.

FIG. 7 is an explanatory diagram illustrating text data converted from the input data in PDF format illustrated in FIG. 3 into XHTML format through optical character recognition. When the input data is description on the web or a book in ePUB format, and the relational formula is described in Presentation MathML, the data is in the same format. Equations are described in Presentation MathML in the parts enclosed by "<math . . . " and "</math>". For example, "<math xmlns=" http://www.w3.org/1998/Math/

MathML"><mi mathvariant="italic">D</mi></math" on lines 4 to 5 represents the part "D" in the sentence "The diffusion coefficient D is related to . . . " in FIG. 3. Equation 5-4 has been transformed into "<math xmlns= . . . >)</mi></math>" on lines 7 to 13. In this way, the text data in XHTML format includes not only equations but expressions of variables alone, described in Presentation MathML. The text data in XHTML format may include other equations such as description indicating relations with a constant and description indicating magnitude correlations. In the relational formula extraction step (S2 in FIG. 1 etc.), equations that may possibly be relational formulae indicating a relation between material property parameters may be selected out from the text data in Presentation MathML included in the text data in XHTML format. This may reduce the subsequent process load.

FIG. 8 is a flowchart illustrating an exemplary method of selecting data to be determined as equations out from among the extracted text data in Presentation MathML. Text data in XHTML format is input (S201). A candidate equation (pMathML) is extracted from the input text data in XHTML format (S202). Since equations are described in Presentation MathML in XHTML format, character strings enclosed by "<math" and "</math>" are extracted as candidate equations. Next, whether the candidate equation includes a sign that defines a relation is determined (S203). Since signs are enclosed by "<mi>" and "</mi>" in Presentation MathML, the determination is made as to whether the sign is one that defines a relation. Signs defining relations may also include "=" (equal), "—" and "h" (approximately equal), and "∝" (proportional). Since some equations show a constant value even if they include equality signs, etc., the left side and the right side are separated from the candidate equation (S204), and whether characters representing a variable are included on the right side is determined (S205). In the character strings (pMathML) of the candidate equation, the character strings on the left side of "<mi>sign</mi>" including the sign determined in S203 is set to be the left side (Lmem), and the character strings on the right side is set to be (Rmem). Next, whether character strings representing a variable is included on the right side is determined (S205). The character strings representing a variable is usually constituted by one or more characters starting with an alphabetic character or a Greek character. When the character strings that represent a variable are defined and when the character strings are enclosed by "<mi>" and "</mi>", the left side (Lmem) may likely include a variable. Then, it is concluded that the candidate equation is an equation (S206). These steps are repeated to the end of the text data in XHTML format (S207).

When different material property parameters are defined for substantially the same material properties (for example, when inversely related two material property parameters are defined, or when one material property parameter by which a complex number is represented and two material property parameters by which a real number and an imaginary number are represented), each of the material property parameters may be processed as an individual material property parameter, or may be collectively processed as a single material property parameter. When each of the material property parameters is processed as an individual material property parameter, the relation between multiple different material property parameters defined for substantially the same material property is set to be one record in the material property relationship database 1, and the relation is defined as a relational formula. When the material property parameters are collectively processed as a single material property parameter, it is desirable to extend the above-mentioned synonym dictionary of the names of material property parameters to specify the range and way of processing the parameters as a single material property parameter. For example, when two material property parameters mutually expressed as the reciprocal are defined for the same material property, if each of the material property parameters is processed as an individual material property parameter, a record with two material property parameters mutually expressed as the reciprocal and a relational formula whose relation is a reciprocal are stored in the material property relationship database 1; and if the material property parameters are collectively processed as a single material property parameter, only one of the material property parameters is stored in the material property relationship database 1, and the other is processed as a synonym, and the relational formula extracted in the 3rd step is transformed into a format using the one of the material property parameters stored in the material property relationship database 1, and then stored in the material property relationship database 1.

In the 6th step (S6), feed the relational formula into the material property relationship database 1 in association with the pair of material property parameters corresponding to two of the multiple variables used in the extracted relational formula. Since the extracted relational formula is an equation with diffusion coefficient D on the left side, the relational formula is input in the record whose diffusion coefficient D is the causative side material property parameter. For the convenience of understanding, data has been input in the relational formula field in in the equation format FIG. 2 to be readable by human users. Actually, however, data is stored in those formats readable by computers, etc., such as Content MathML illustrated in FIG. 6.

As described above, a method is provided of extracting a relational formula that associates two material property parameters from a textbook document using a computer and storing the extracted relational formula in a material property relationship database.

<Derivation of Relational Formula for Calculating Cause-Side Material Property Parameter>

The information processing method of the invention can further include a step of deriving a transformed relational formula for calculating a variable other than the variable (variable on the left side) calculated by the relational formula extracted from the input data of a textbook, etc.

FIG. 9 is a flowchart illustrating another modification of the information processing method according to the first embodiment. In FIG. 9, added is the 7th step (S7) of deriving a transformed relational formula that calculates a variable other than the variables calculated by the relational formula from the relational formula extracted in the 2nd step (S2) and converted into the format that describes quantitative relations in the 3rd step (S3). Since the relational formula has been transformed into a form for describing quantitative relations in the 3rd step (S3), the relational formula can be transformed into a form for calculating each variable through equation transformation. The transformed equation will be referred to as a transformed relational formula.

In the 6th step (S6), not only the relational formula extracted from the input data but the transformed relational formula derived in the 7th step (S7) are fed into the relational formula fields of the corresponding records of the material property relationship database 1 in association with a pair of material property parameters whose effect-side material property parameter is the material property parameter that corresponds to the variable calculated by the transformed relational formula.

In this manner, also regarding those variables that are not direct calculation targets in relational formulae extracted from input textbook, etc., relational formulae for obtaining corresponding material property parameters are input in the material property relationship database by a computer, reducing manhour.

In the added 7th step (S7), the transformed relational formula for calculating each variable is derived through purely mathematical equation transformation. Therefore, there may be cases where no material property parameter corresponding to the variable appearing on the left side exists, and where no record whose material property parameter corresponding to the variable that appears on the left side is an effect-side material property parameter exists in the material property relationship database 1. In these cases, a step of asking a user to determine whether any causal relation exists or whether the relation should be stored in the material property relationship database 1 may be added.

In the example given at the lower part of FIG. 2, the transformed relational formula transformed to derive activation energy Q has been input in the relational formula field of the record in the third row. Those transformed relational formulae for deriving frequency factor Do, gas constant R, and absolute temperature T have not been input in the material property relationship database 1 due to lack of corresponding records. Since gas constant R and absolute temperature T are not material property parameters, it is natural that there exists no record where transformed relational formulae for deriving gas constant R and absolute temperature T are to be input. Since frequency factor Do is a material property parameter, it may be configured to examine whether it is proper that there is no record for inputting the transformed relational formula for deriving frequency factor Do. For example, in a case where no corresponding record exists in the material property relationship database 1 although the left side of the derived transformed relational formula is a material property parameter, a step of asking the user to determine whether to add the corresponding record may be added. In this manner, deficiencies in the material property relationship database 1 can be detected to improve reliability.

Instead of adding this step, the 7th step (S7) may be added subsequent to the 6th step (S6). It is detected that a record that defines an inverse causal relation exists in the material property relationship database 1, and a transformed relational formula for deriving the material property parameter on the effect side at that time is obtained and is input in the relational formula field of the record. In this manner, computational load for generating a transformed relational formula can be minimized.

While the illustrated material property relationship database 1 is an exemplary database where a pair of material property parameters having a causal relation is stored separately on the cause side and the effect side, the material property parameters may be stored in a non-separated manner. In this case, derivation of transformed relational formulae may be executed as needed at the search stage.

<Extract Condition to Satisfy Relational Formula>

A relational formula that defines a relation between material property parameters may be attached with conditions under which it is satisfied. Even when a general expression that is completed under every condition may be defined, since some of terms may become negligibly small under some conditions, relational formulae with such terms omitted are used in many cases. Even in textbooks, relational formulae are described as being completed under such certain conditions in many cases. In such cases, different relational formulae are defined under different conditions for the same pair of material property parameters.

In the information processing method of the invention, a conditional relational formula may be properly processed by adding a step of extracting a condition under which a relational formula is completed from the input data, and inputting the extracted condition in the material property relationship database.

FIG. 10 is a flowchart illustrating another modification of the information processing method according to the first embodiment. In parallel with the 4th step (S4) of extracting the variable definition, an 8th step (S8) of extracting a completion condition of a relational formula from the input data has been added. In the 3rd step (S3), the relational formula and the variables included therein are extracted, and in the 4th step (S4), the description where the variables are defined is searched for and extracted. In parallel with these steps, the condition under which a relational formula is satisfied may be searched for. In general, the conditions under which a relational formula is satisfied are sometimes defined as a value range which the variables used in the relational formula may take, and are often described near the description of the variable definition. Therefore, searching in parallel is efficient.

In the 8th step (S8), a condition under which the relational formula extracted in the 3rd step (S3) is satisfied is extracted from the input data. In the subsequent 6th step (S6), the condition extracted in the 8th step (S8) is input in a condition field (see FIG. 2) of the material property relationship database 1 in association with a pair of material property parameters that includes a material property parameter corresponding to a variable calculated by the relational formula.

In this manner, a material property relationship database capable of being used in a search system that can properly process relations established under some conditions can be created with reduced manhour.

Specifically, for example, this can be realized by adding a step of extracting description indicating a condition in a flowchart as illustrated in FIG. 8 for extracting an equation from input XHTML text data. In parallel with the step of determining whether the candidate equation (pMathML) includes an equality sign, etc., (S203), when the candidate equation (pMathML) includes one or more inequality signs, the candidate is extracted as an equation indicating a condition. Two or more inequality signs, specifying a range, can mean a condition under which a relational formula is completed. Further, in parallel with the step (S205) of determining whether character strings representing a variable is included on the right side, when character strings representing a variable is not included on either of the left and right sides, that is, one of the sides is a constant, the candidate equation is extracted as an equation representing a condition. Further, even if the candidate equation that has been recognized as an equation because characters are included on the right side (S205, S206), the equation can be an equation indicating a condition. For example, when "temperature T is close to melting point Tm" is a completion condition of a relational formula, the condition may be expressed as "T~Tm". In this case, the same candidate equation is processed as a relational formula and a candidate equation representing a completion condition of a relational formula. Since the completion condition of a relational formula is not always expressed by an equation, natural language processing is also used. Such exception may include "in the case of transition metal" and "in the case of an insulator".

<Processing Different Conditions>

In the 6th step (S6), when a newly extracted condition is to be input in the material property relationship database 1, another condition may already be associated with a pair of material property parameters with which the extracted condition is to be associated. This is because even the same pair of material property parameters may have a relation defined by other relational formulae under different conditions. In this case, the record corresponding to the pair of material property parameters is copied, one record for the same pair of material property parameters is added, and the relational formula extracted in the 3rd step (S3) and the condition extracted in the 8th step (S8) are input in the relational formula field and the condition field, respectively, of the added record. As a result, the material property relationship database 1 contains multiple records for the same pair of material property parameters, and stores different relational formulae and different conditions under which the relational formulae are completed.

In this manner, a material property relationship database capable of being used in a search system that can properly process relations established under various conditions can be created with reduced manhour.

<Collation with Already Input Relational Formula>

In the information processing method of the invention, in the 6th step (S6), when a newly extracted relational formula is to be input in the material property relationship database 1, another relational formula may already be associated with a pair of material property parameters with which the extracted relational formula is to be associated. A case where the same relational formula is satisfied under different satisfying conditions as described above may be included in the above example. However, various other factors may exist for inconsistency including, for example, no condition has been input in a record where a relational formula is already input, different relational formulae under the same satisfying condition are to be input, and different satisfying conditions are extracted for the same relational formula.

In order to eliminate such inconsistency, it is necessary to trace back to the source of each of the two inconsistent relational formulae. This is because such inconsistency is supposed to arise when, for example, textbooks are based on various environments (conditions) under which relational formulae are satisfied.

Therefore, desirably, the information processing method of the invention may further include a step of collating a newly extracted relation with another already stored relation if another relation has already been stored in association with the same pair of material property parameters when the newly extracted relational formula is to be input in the material property relationship database 1 in the 6th step (S6). When the relational formulae are found inconsistent as a result of collation, the user may be notified to address the same. When the conditions are different even if the relational formulae are inconsistent as a result of collation, the above-mentioned <Processing Different Conditions> may be executed without any notification to the user.

In this manner, reliability of the material property relationship database and the search system using the database can further be enhanced.

<Determination of Dependent Variable and Derivation of Relational Formula>

Regarding the multiple variables used in the relational formulae extracted together with the relational formulae in the 3rd step (S3), the information processing method of the invention may add a step of determining whether each of the variables is an independent variable or a dependent variable.

When the relational formula is $z=f(x, y)$, it is understood that x and y are mutually independent variables, intuitively judged from the form thereof. Regarding material properties, however, the material property parameter y may be changed with the material property parameter x. If such dependence exists, the relation between the material property parameters z and x may be misjudged. For example, when it is judged based only on the description of the function f, when z is proportional to x and inversely proportional to y, it will be understood that "z is proportional to x". Here, when y is a dependent variable proportional to $x^2$, the relation where z is inversely proportional to the square of x may be exhibited more noticeably as a whole. In this case, it is possible the above understanding that "z is proportional to x" is incorrect. However, since the relation depends on the values of the variables, it cannot be concluded that the understanding is incorrect. Therefore, it is necessary for the user to make a judgment.

Figure 11:
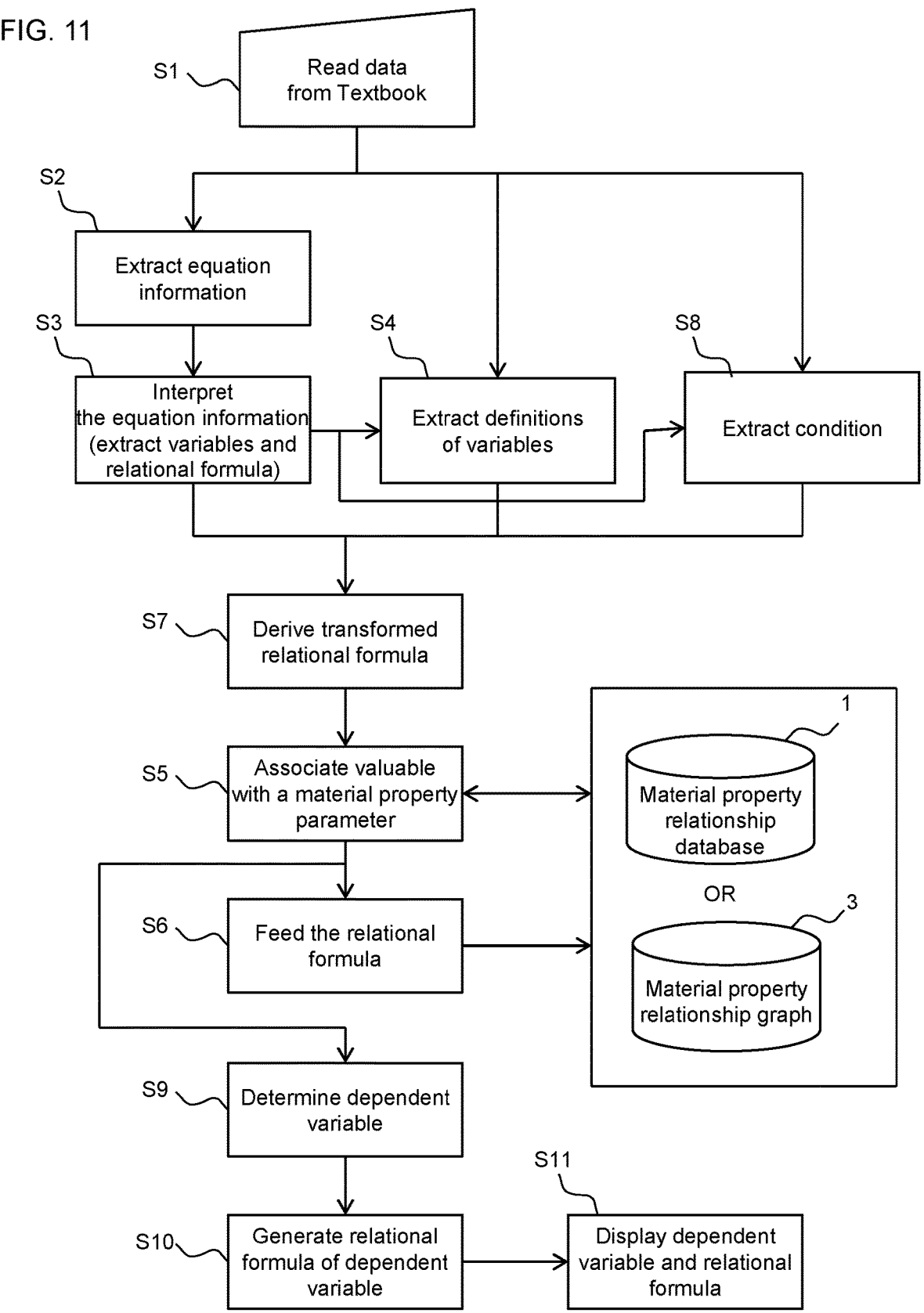
FIG. 11 is a flowchart illustrating still another modification of the information processing method according to the first embodiment.

FIG. 11 is a flowchart illustrating still another modification of the information processing method according to the first embodiment. The information processing method further includes: in addition to the 5th step (S5) of associating a variable with a material property parameter; a 9th step (S9) of determining whether each variable is an independent variable or a dependent variable; a 10th step (S10) of generating a dependent variable relational formula for calculating the dependent variable when the extracted variable is a dependent variable; and an 11th step (S11) of displaying the calculated dependent variable relational formula.

In the 9th step (S9), by referring to the material property relationship database 1 or a material property relational graph 3 (described later) generated from the database 1, whether each variable is an independent variable or a dependent variable can be determined based on a causal relation between material property parameters corresponding to each variable. In the above example, it is obvious that z and x and z and y have a causal relation, respectively, and there are edges each connecting z and x, and z and y in the material property relational graph 3 generated from the material property relationship database 1. Strictly, material property parameters and nodes corresponding thereto should be distinguished, but material property parameters x, y and z and nodes x, y and z corresponding thereto are described in the same manner here. It is found that if there is an edge directly connecting x and y in the material property relational graph 3, one of x and y is a variable dependent on the other. When the material property relational graph 3 is a directed graph, it is obvious either of x or y is a dependent variable. While the material property relational graph 3 is used for description, the material property relationship database 1 also contains equivalent information. Therefore, the same judgment may be made by referring to presence/absence of a record in the material property relationship database 1, not to presence/absence of an edge in the material property relational graph 3.

When it is determined that a certain variable is a dependent variable in the 9th step (S9), a dependent variable relational formula for calculating the variable is generated in the 10th step (S10), and the dependent variable relational formula calculated is displayed in the 11th step (S11). The calculated dependent variable relational formula may be input in the material property relationship database 1. When y is a dependent variable depending also on x in the above example, a record with the cause-side material property parameter being x and the effect-side material property parameter being y is stored in the material property relationship database 1. Therefore, the dependent variable relational formula may be input in the relational formula field of the record. This step is not illustrated in FIG. 11. A step of outputting the dependent variable relational formula may be added in place of or in addition to the 11th step (S11).

In this manner, dependent variables can be processed properly in the material property relationship database and in the search system using the database.

Second Embodiment

By using the material property relationship database 1 where the relational formula has been input by the information processing method according to the first embodiment, it is possible to provide a search system for searching in consideration of quantitative relations between material properties.

FIG. 12 is a block diagram illustrating an exemplary configuration of a search system according to a second embodiment.

The second embodiment is a search system 10 including a material property relationship database 1, a graph generator 2 and a graph searcher 4, and is configured as follows.

The material property relationship database 1 stores, in association with each other, a pair of mutually related material property parameters, and a relational formula for calculating a value of one of the pair of material property parameters using a value of the other of the pair. The method for inputting a relational formula in the material property relationship database 1 may desirably be the information processing method according to the first embodiment, but not limited to the same. For example, it is possible to collectively extract a pair of material property parameters having a mutual causal relation, a relational formula thereof, and a satisfying condition of a relational formula by using the same information processing method using textbooks, etc., as input data, and create a material property relationship database. By integrating the constituted multiple material property relationship databases by using the same information processing method with the multiple textbooks as input data, the material property relationship database 1 can be used in the search system 10 according to the second embodiment.

The graph generator 2 generates a material property relational graph 3 where nodes represent multiple material property parameters included in a pair of material property parameters stored in the material property relationship database 1, and edges represent in-between nodes corresponding to the pair of material property parameters. The graph searcher 4 executes path search in the material property relational graph 3 under given search conditions, and outputs a path as a search result together with a relational formula corresponding to edges included in the path.

The search system 10 further includes a relational formula extractor 20 that extracts a relational formula between material property parameters having a causal relation from input data of a textbook, etc., and inputs the extracted relational formula in the material property relationship database 1. The relational formula extractor 20 inputs relational formulae in the material property relationship database 1 by using the information processing method according to the first embodiment. The relational formula extractor 20 includes, for example, a relational formula recognizer 21, a variable definition recognizer 22, and a relational formula generation unit 23. The relational formula recognizer 21 recognizes and extracts equation information indicating relational formulae included in the input data. That is, the relational formula recognizer 21 is configured capable of executing the processes equivalent to the 2nd and 3rd steps (S2, S3) of the first embodiment. The variable definition recognizer 22 extracts and recognizes description that defines a variable from sentences included in the same input data. That is, the variable definition recognizer 22 is configured capable of executing the process equivalent to the 4th step (S4) of the first embodiment. The relational formula generation unit 23 associates a material property parameter stored in the material property relationship database 1 with the variable based on the recognized variable definition, and inputs the extracted relational formula in a relational formula field in the material property relationship database 1. That is, the relational formula generation unit 23 is configured capable of executing the processes equivalent to the 4th and 6th steps (S5, S6) of the first embodiment.

As described above, when outputting a search result that satisfies a given search condition, the search system 10 can output the search result in consideration of quantitative relations between the material properties regarding the path included in the search result. That is, a search system can be provided for searching in consideration of quantitative relations between material properties using a material property relationship database where relational formulae between material property parameters having causal relations are input. Further, the search system 10 is provided with a configuration to extract a relational formula from a textbook, etc., and input the extracted relational formula in the material property relationship database 1, which configuration simplifies management of the material property relationship database 1.

The relational formula recognizer 21, the variable definition recognizer 22 and the relational formula generation unit 23 are configuration to execute operations equivalent to the 1st to 6th steps (S1 to S6) described in the first embodiment. The search system 10 may further include a configuration for executing an operation equivalent to each of the other steps described in the first embodiment.

For example, the material property relationship database 1 may have an area for storing a condition under which a relational formula is completed in association with the relational formula. In the material property relational graph 3, in this case, the relational formula and the condition stored in the material property relationship database 1 are considered as an attribute of the edge corresponding to the associated pair of material property parameters. In this manner, relations established under some conditions can be processed properly.

Since the relational formula extractor 20 can extract a relational formula having different satisfying conditions for the same pair of material property parameters, the material property relationship database 1 is desirably configured capable of storing multiple relational formulae having different conditions under which a relational formula is satisfied for the same pair of material property parameters in the search system 10. For example, the material property relationship database 1 is configured capable of storing multiple records for the same pair of material property parameters, and storing each relational formula and a condition under which the relational formula is completed for that relational formula for each record. Correspondingly, the graph generator 2 generates a material property relational graph 3 where nodes correspond to the same pair of material property parameters to which the multiple relational formulae are associated, and edges represent in-between the nodes each having a relational formula and a completion condition of the relational formula as an attribute thereof. In this manner, relations established under various conditions can be processed properly.

<Calculation of Composite Function>

As described above, when outputting a search result that satisfies a given search condition, the search system 10 can output the search result in consideration of quantitative relations between the material properties regarding the path included in the search result. As one embodiment thereof, the graph searcher 4 can compose relational formulae corresponding to each edge for the path included in the search result and constituted by multiple edges and output composed formula.

With this configuration, regarding a relation between material property parameters defined via multiple material property parameters, a quantitative relation along a path can be processed properly and easily.

The operation of the search system 10 at this time will be briefly described. Regarding material property parameters X, Y and Z, the relation between the material property parameters X and Y is represented by the relational formula $Y=f(X)$, and the relation between the material property parameters Y and Z is represented by the relational formula $Z=g(Y)$. Regarding the nodes X, Y and Z corresponding to the material property parameters X, Y and Z, the material property relational graph 3 has edges between the nodes X and Y and the nodes Y and Z, to which edge the relational formula $Y=f(X)$ and $Z=g(Y)$ is given as an attribute, respectively. When the path from node X to node Z via node Y is output as the search result, a composite function $Z=g(f(X))$ is calculated and output corresponds to the path X-Y-Z that is the result of the path search. While the relational formulae $Y=f(X)$ and $Z=g(Y)$ may be displayed for each of the path X-Y and the path Y-Z, showing the composite function is better in that a change in the material property parameter at the end point upon an increase or decrease of a certain material property parameter at a start point can be processed quantitatively.

<Search Method Displaying Relational Formula along Path of Search Result>

The search system 10 can be constructed to function as software on a hardware system including a storage device and a processor. Therefore, the invention may be regarded as a search method using a hardware system provided with a storage device and a processor.

FIG. 13 is a flowchart illustrating an exemplary configuration of the search method according to the second embodiment.

The search method according to the second embodiment is a search method using a computer provided with a storage device. The method includes a graph generation step (S22) and a graph search step (S23), and is configured as follows.

In the graph generation step (S22), a material property relational graph 3 (not illustrated in FIG. 13) is generated where nodes represent multiple material property parameters included in a pair of material property parameters stored in the material property relationship database 1, and edges represent in-between nodes corresponding to the pair of material property parameters. In the graph search step (S23), path search in the material property relational graph 3 is executed under given search conditions (S24), and a path is output as a search result together with a relational formula corresponding to edges included in the path (S25).

In this manner, a search system is provided for searching in consideration of quantitative relations between material properties using a material property relationship database where relational formulae between material property parameters having causal relations are input.

The search method more desirably includes a relational formula/variable definition extraction step (S20) and a material property relationship database input step (S21). In the relational formula/variable definition extraction step (S20), a relational formula and variable definition contributing to the relational formula are extracted from the input data of the textbook, etc. In the material property relationship database input step (S21), the extracted variable is associated with the material property parameters stored in the material property relationship database 1, and the extracted relational formula is input in the material property relationship database 1.

In this manner, a method of extracting a relational formula that associates multiple material property parameters from a textbook document using a computer and storing the extracted relational formula in a material property relationship database, and a search system for searching in consideration of quantitative relations between material properties using the material property relationship database can be provided at the same time, which simplifies management of the material property relationship database.

Further, as described above, the material property relationship database 1 may have an area for storing a condition under which a relational formula is satisfied in association with the relational formula. In the material property relational graph 3, the relational formula and the condition are considered as an attribute of the edge corresponding to the associated pair of material property parameters.

Also in the search method of the second embodiment, the material property relationship database 1 can store multiple relational formulae to be satisfied under different conditions for the same pair of material property parameters, and correspondingly, in the graph generating step (S22), a material property relational graph 3 is generated where nodes correspond to the same pair of material property parameters to which the multiple relational formulae are associated, and edges represent in-between the nodes each having a relational formula and a satisfying condition of the relational formula as an attribute thereof. In this manner, relations established under various conditions can be processed properly.

<Calculation of Composite Function>

As described above, in the search method of the second embodiment, when outputting a search result that satisfies a given search condition, the search system 10 can output the search result in consideration of quantitative relations between the material properties regarding the path included in the search result. As one embodiment thereof, in the graph search step (S23), regarding a path constituted by multiple edges included in the search result, relational formulae corresponding to edges included in the path can be composed and composed function is output. With this configuration, regarding a relation between material property parameters defined via multiple material property parameters, a quantitative relation along a path can be processed properly and easily.

The relational formula/variable definition extraction step (S20) and the material property relationship database input step (S21) are equivalent to the 1st to 6th steps described in the first embodiment. The search method according to the second embodiment may further include each step equivalent to each of other steps described in the first embodiment.

Third Embodiment

<Influencing Factor>

As described in the second embodiment, by executing path search in the material property relational graph 3 generated from the material property relationship database 1, a relational formula representing a quantitative relation between material properties, a composite function, etc., regarding a path included in the search result can be output. However, the relational formula can include other factors than material properties in addition to material property parameters. These factors, which are not material properties but affect material properties, are called influencing factors herein.

The search system of the second embodiment executes path search in the material property relational graph 3 generated from the material property relationship database 1, and outputs a path as a search result together with a relational formula and a composite function corresponding to edges included in the path. In this search system, contribution of the influencing factor is appearing in the relational formula and composite function, but is not considered in the search itself.

The present inventor has invented a search system capable of reflecting contribution of an influencing factor on search, and filed a patent application as Japanese Patent Application No. 2018-194118. The search system is provided with a material property relationship database, a graph generator, a graph searcher, and also an influencing factor database, an influence determiner, and a search result output unit. Regarding a material property parameter corresponding to each node included in the path extracted as a result of the path search, the search system determines presence/absence of dependence on an influencing factor, and outputs the combination of the material property parameter and the influencing factor determined to have dependence together with dependence information.

Also in the invention, by adding the influencing factor database, the influence determiner, and the search result output unit to the search system 10 (FIG. 12) of the second embodiment, contribution of the influencing factor can be made to reflect on the search.

Figure 15:
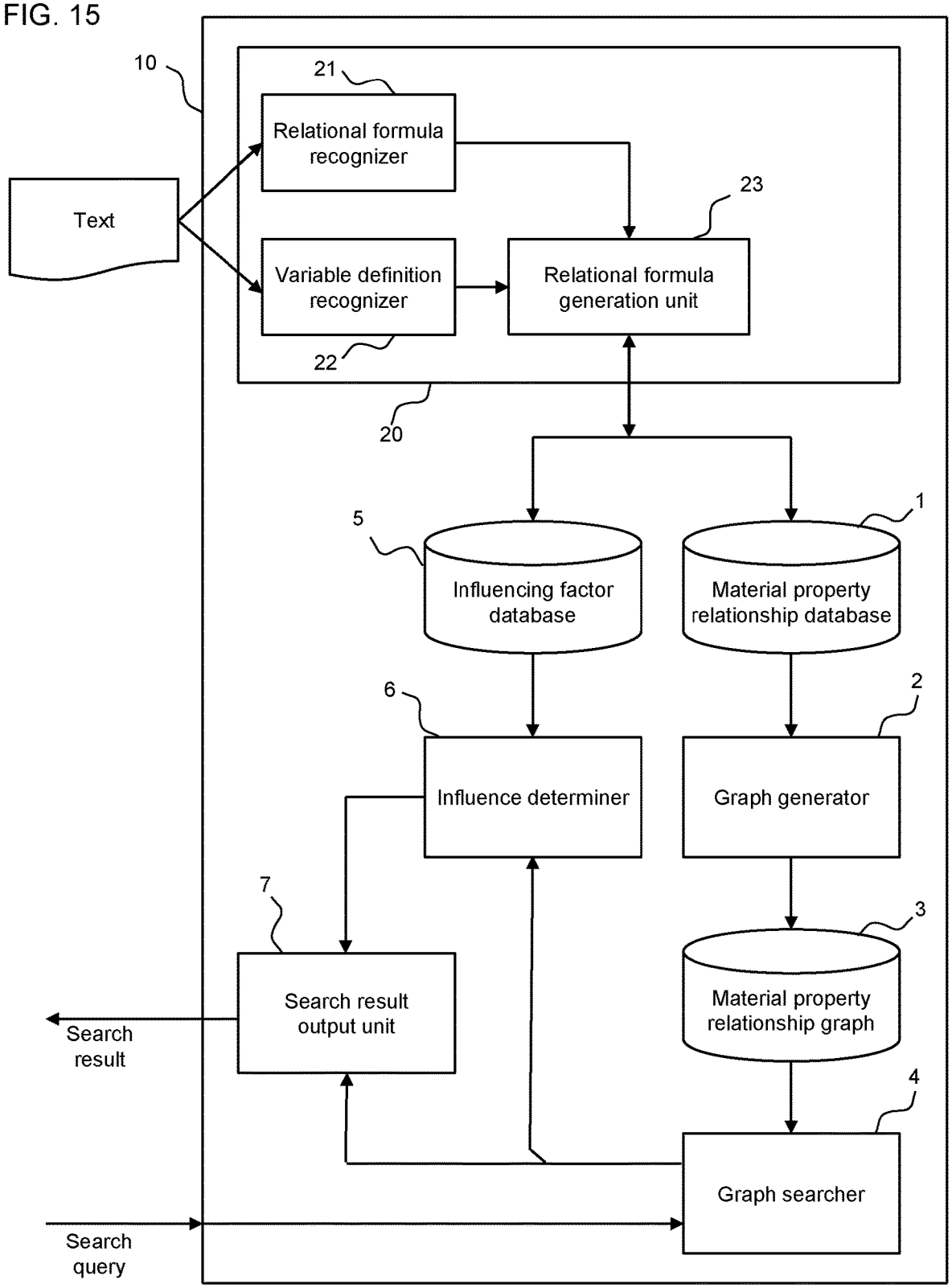
FIG. 15 is a block diagram illustrating an exemplary configuration of a search system according to a third embodiment.

FIG. 15 is a block diagram illustrating an exemplary configuration of a search system 10 according to a third embodiment. The search system 10 according to the third embodiment is provided with the material property relationship database 1, the graph generator 2, the graph searcher 4 illustrated in the search system of the second embodiment (FIG. 12), and also an influencing factor database 5, an influence determiner 6 and a search result output unit 7. Since the configurations and operations of the material property relationship database 1, the graph generator 2 and the graph searcher 4 are the same as those in the second embodiment, description thereof will be omitted. The influencing factor database 5 stores, in association with one another, each of multiple material property parameters constituting the material property relational graph 3, an influencing factor on which the material property parameter has dependence, and a relational formula indicating the dependence. The influence determiner 6 determines whether the material property parameter corresponding to the node included in the search result is dependent on at least one influencing factor by referring to the influencing factor database 5. The search result output unit 7 outputs, together with the search result, a combination of the material property parameter and the influencing factor determined by the influence determiner 6 to have dependence, and the relational formula thereof.

As in the second embodiment, the search system 10 includes a relational formula extractor 20 that extracts a relational formula between material property parameters having a causal relation from input data of a textbook, etc., and inputs the extracted relational formula in the material property relationship database 1. The relational formula extractor 20 inputs relational formulae in the material property relationship database 1 by using the information processing method according to the first embodiment. Since the basic operation of the relational formula extractor 20 is the same as that described with reference to FIGS. 2 to 6, detailed description thereof will be omitted. The relational formula extractor 20 also extracts relational formulae, etc., from the input data of the textbook, etc., for the influencing factor database 5.

FIG. 16 is an explanatory diagram illustrating a relation between the material property relationship database 1 and the influencing factor database 5. The upper part of FIG. 16 illustrates one of the examples of the material property relationship database 1 illustrated in FIG. 2. The "relational formula" field is filled based on the diffusion equation (FIG. 4) extracted from the textbook illustrated in FIG. 3. The relational formulae input in the records in the first and second rows are obtained by transforming the extracted diffusion equations into Content MathML, and the relational formula input in the record in the third row is obtained by transforming the same relational formula into a format for obtaining variable Q. In the influencing factor database 5, the "cause-side material property parameter" field which is the first row of the material property relationship database 1 may be replaced with the "cause-side influencing factor". Desirably, presence/absence of a relation between a material property parameter and an influencing factor is stored in the first and second rows, and a relational formula representing the relation is stored in the third row. When only the presence of a relation (dependence) is extracted from a textbook, etc., the field of the relational formula in the third row is blank, with no data therein.

The material property search will be described.

The material property relational graph 3 is, as in the second embodiment, a graph where nodes represent multiple material property parameters included in a pair of material property parameters stored in the material property relationship database 1, and edges represent in-between nodes corresponding to the pair of material property parameters. The graph searcher 4 executes path search in the material property relational graph 3 under given search conditions, and outputs a path as a search result together with a relational formula corresponding to edges included in the path. In the third embodiment, nodes corresponding to influencing factors stored in the influencing factor database 5 have been added to the material property relational graph 3, and edges are added between nodes corresponding to influencing factors and the nodes corresponding to material property parameters depending on the influencing factors. The graph searcher 4 executes path search in the material property relational graph 3 under given search conditions. However, the path from a node corresponding to a certain material property parameter to a node corresponding to another material property parameter via a node corresponding to an influencing factor may be excluded from the target of the path search. This is because knowing whether a certain material property parameter is dependent on an influencing factor means a lot to a user but generally there is no need to comprehensively extract all the material property parameters that are dependent on the influencing factor.

The influencing factor database 5 will be described in more detail.

It is more desirable that the influencing factor database 5 is configured separately for each influencing factor of subordinate concept, such as an environment description database 11, a morphological description database 12, and a size description database 13.

The environment description database 11 contains at least one of temperature, pressure, electric field and magnetic field as an influencing factor, and stores a material property parameter that depends on the influencing factor among multiple material property parameters in association with dependence information indicating dependence thereof. The influencing factor held in the environment description database 11 is a factor indicating the environment in which the substance is placed, which factor may affect the material properties or material property parameters of the substance.

The morphological description database 12 contains at least one of spherical, columnar, linear, cluster, surface area/volume ratio, orientation direction and dispersion as an influencing factor, and stores a material property parameter that depends on the influencing factor among multiple material property parameters in association with dependence information indicating dependence thereof. The influencing factor held in the morphological description database 12 is an influencing factor indicating shapes and states of substances. Since shapes and states of substances may affect the material properties or material property parameters of substances, these shapes and states may be considered as one of the influencing factors.

The size description database 13 contains at least one of length, diameter, nano, micro, and bulk as an influencing factor, and stores a material property parameter that depends on the influencing factor among multiple material property parameters in association with dependence information indicating dependence thereof. While the influencing factor held in the morphological description database 12 indicates the shape and state of the substance, the size description database 13 holds influencing factors indicating size of shape and state. While the exemplified "length" and "diameter" are influencing factors to which an absolute value can be given, "nano", "micro" and "bulk" are influencing factors not representing an absolute value, but some ranges of values. The influencing factor like "length" or "diameter" may be included in an equation that defines a material property parameter as a variable and represent a quantitative relation. The influencing factor like "nano", "micro" or "bulk" indicates the size of a substance since there is a case where some properties that had not appear in a bulk state can first appear in a nano-sized microstructure. In this manner, since both are influencing factors representing the size of shape and state of a substance, these are held in the same size description database 13 in the illustrated embodiment. These are, however, conceptually slightly different, and may be separately held in two databases.

In this manner, the influencing factor database is divided into sub-databases of different concepts, and the users' convenience can be improved when the user uses dependence of the influencing factor of the material property parameter for displaying or selecting out a search result.

Figure 17:
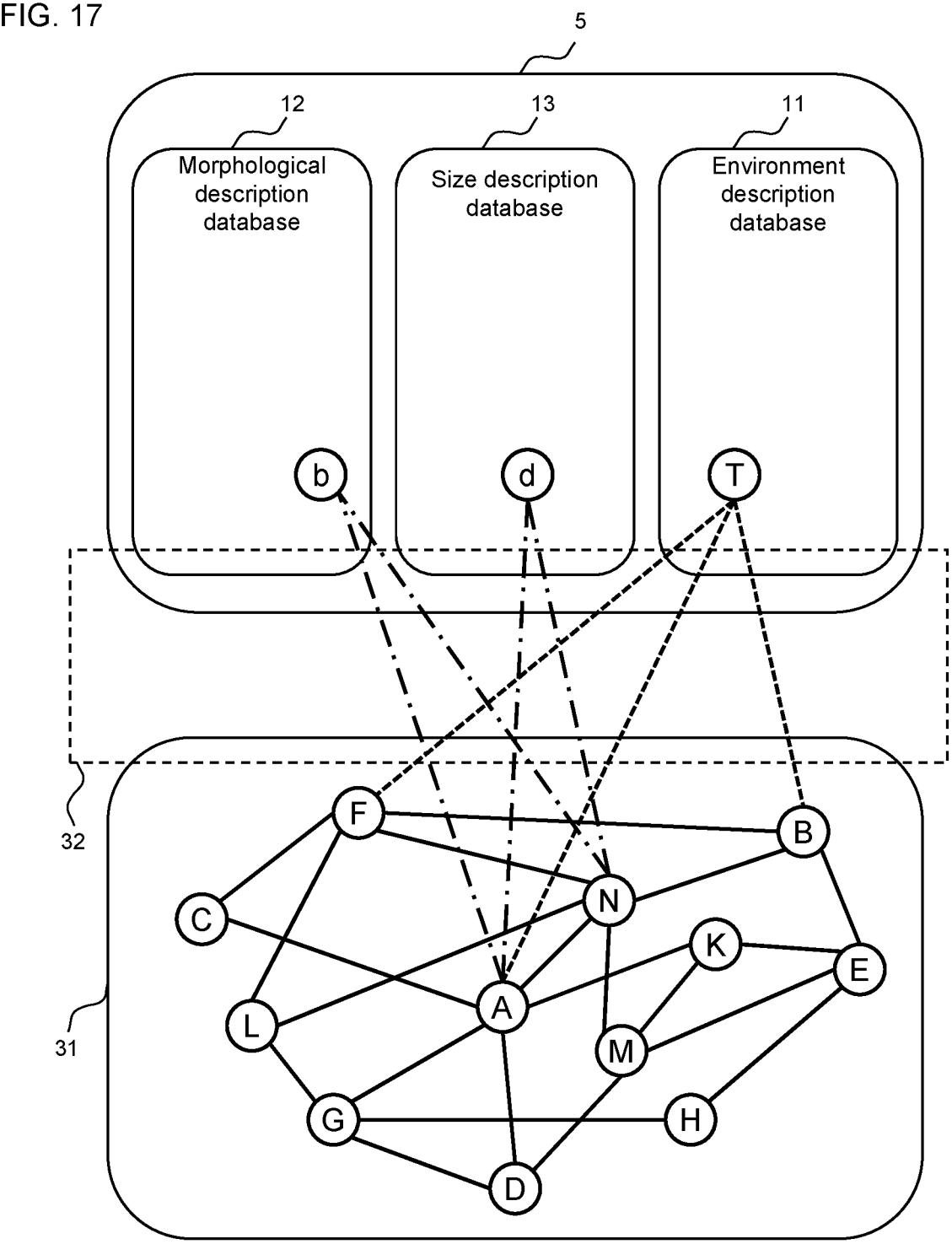
FIG. 17 is an explanatory diagram of display of dependence information of influencing factors by the search system according to the third embodiment.

FIG. 17 is an explanatory diagram of display of dependence information of influencing factors by the search system according to the third embodiment.

As described above, the influencing factor database 5 includes databases of subordinate concepts: the environment description database 11, the morphological description database 12 and the size description database 13. Such division, however, is not necessary. Divisions other than those three described above or influencing factors not falling into the divisions may be included in the influencing factor database 5. A search result 31 output from the graph searcher 4 is displayed as a subgraph. The material property parameters correspond to nodes, and two nodes corresponding to mutually related pair of material property parameters are connected by an edge. When the search result 31 is multiple paths, since the start point and the end point are usually common, the result is displayed as a subgraph. The dependence information of the influencing factor may be displayed together with the search result in various manners.

The search result output unit 7 adds and displays the influencing factor determined to have dependence by the influence determiner 6 as a new node, and adds and displays a new edge between the added new node and a node corresponding to a material property parameter depending on the influencing factor. The added new edge indicates presence of dependence. In the example illustrated in FIG. 17, nodes b, d and T are added, a dependence display area 32 is provided, and an edge indicating the dependence is added. Grid lines of the influencing factor database 5, the environment description database 11, the morphological description database 12, and the size description database 13 are not necessarily have to be displayed, but displaying grid lines can improve visibility by users. Node T is added to show that the material property parameters corresponding to nodes A, B and F depend on temperature T, and edges (broken lines) are added between the nodes T-A, T-B and T-F, respectively. Further, that the material property parameters corresponding to nodes A and N depend on diameter d as the size when being morphologically spherical is indicated by nodes b and d, and edges (one-dot chain lines) between nodes b-A, b-N, d-A and d-N.

In this manner, contribution of the influencing factor to the material properties is visualized, which further improves users' convenience. For example, when the material property parameters corresponding to node A are controlled in order to optimize the material property parameters corresponding to node B, if control is executed based on the path A-N-B as a principle, it is found that the material property parameter corresponding to node N may possibly fluctuate depending on diameter d. If such fluctuation is unfavorable, it is found that other paths, like A-C-F-B and A-K-E-B, should be considered.

The search result output unit 7 can be configured capable of externally designating one or multiple influencing factors from among influencing factors determined by the influence determiner 6 to have dependence. This is effective when the edges are congested and visibility is low due to presence of many influencing factors having dependence. Further, since only dependence of the influencing factors interested by the user can be displayed, visibility is improved. On the other hand, by outputting dependence information from all the factors influencing each of the material property parameters corresponding to all the nodes constituting the subgraph which is the search result without using a function to designate influencing factors interested by the user, the user may be given an opportunity to notice. An exemplary case is that a user finds that a material property parameter on the path about to be selected has strong dependence on an unexpected influencing factor and is thus not actually a proper path.

The searched paths can be displayed in a prioritized manner: for example, in order to take advantage of both the case where influencing factors can be designated and where cannot, all the existing relations may be displayed and dependence information of the selected influencing factor may be highlighted. While effects of factors that are of great interest to the user are highlighted, effects of other factors are also displayed. This may give the user an opportunity to notice the effects of unexpected factors.

In the search system 10 of the third embodiment, regarding the material property parameter determined by the influence determiner 6 to have dependence of one or multiple influencing factors, the search result output unit 7 is further desirably configured capable of displaying corresponding dependence information on the corresponding node and/or edge. Dependence information includes presence/absence of dependence and a relational formula indicating the dependence. For example, when the material property parameters corresponding to node A are controlled in order to optimize the material property parameters corresponding to node B, if control is executed based on the path A-N-B as a principle, it is found that the material property parameter corresponding to node N may possibly fluctuate depending on diameter d. At this time, by referring to the influencing factor database 5, a relational formula indicating how the material property parameter corresponding to node N depends on diameter d can be associated with the edge between node N and node d and displayed. For example, a function formula pops up when the edge between nodes N and d is clicked. The information of the search result may be output as data not through such a graphical user interface, or in combination with a graphical user interface.

Further, the relational formula may be analyzed and classified into, for example, increase/decrease more gradually than linearly, increase/decrease linearly, increase/decrease in power (i.e., square, cube, . . . ), and increase/decrease exponentially, including correlation of polarity (i.e., positive correlation or negative correlation) and the type of relations. The relational formula may be displayed as dependence information at the node on the side having dependence on such an influencing factor.

Further, an inverse function may be derived and output upon display or output of the corresponding relational formula on the edge representing the relation between the material property parameter and the influencing factor. For example, when material property parameter A corresponding to node A depends on temperature T which is the influencing factor corresponding node T, the relational formula is in the form of "A=f(T)", which is transformed into the form for obtaining temperature T and the obtained "T=f−1(A)" is displayed or output together. Although influencing factors such as environment, morphology and size are not changed depending on the material property values, these factors may be used, in a reaction process, etc., in determining temperature of a system in which the process occurred, morphology and size of materials involved in the process, such as a material substance, a reaction product, and an intermediate products from the measured material property values.

Fourth Embodiment

<Hardware/Software Implementation>

The information processing method of the first embodiment and the search system and the search method of the second embodiment are constructed to function as software on a hardware system including a storage device and a processor.

Figure 14:
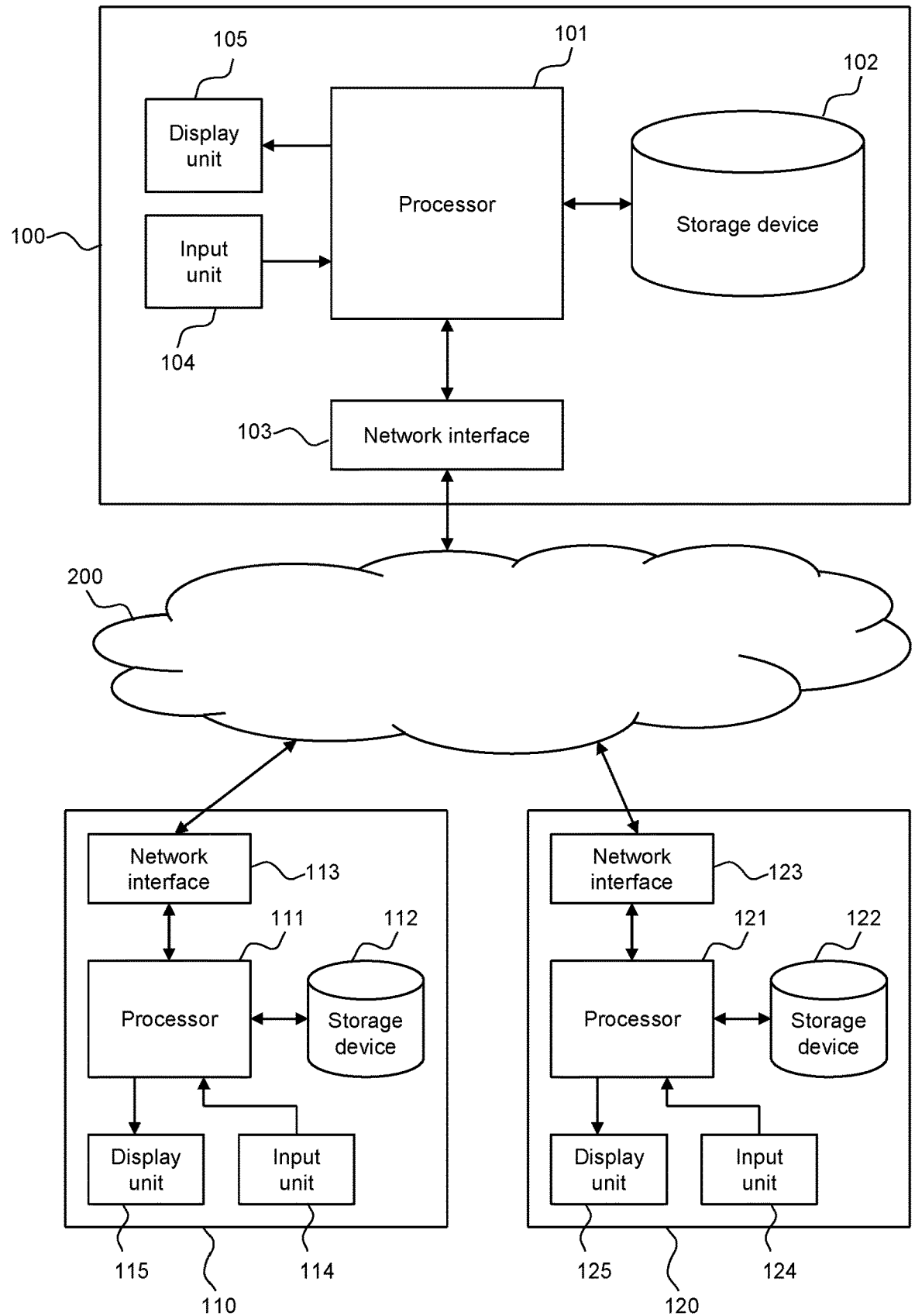
FIG. 14 is a block diagram illustrating an exemplary hardware system used in the information processing method and the search method of the invention and in which a search system 10 is implementable.

FIG. 14 is a block diagram illustrating an exemplary hardware system used in the information processing method and the search method of the invention and in which the search system 10 is implementable.

A server 100 and user-side workstations 110 and 120 are connected to a network 200 such as the Internet. The server 100 includes a processor 101, a storage device 102, a network interface 103, an input unit 104 and a display unit 105.

If the input and output is sufficiently made via the network 200, the input unit 104 and the display unit 105 may be omitted. The user-side workstations 110 and 120 also include processors 111 and 121, storage devices 112 and 122, network interfaces 113 and 123, input units 114 and 124, and display units 115 and 125, respectively. The search system 10 may also be implemented without being connected to the network 200. The network interface 103 may be omitted from the server 100, and the entire functions of the information processing method, the search system 10 and the search method of the invention may be implemented in the processor 101, the storage device 102, the input unit 104, and the display unit 105.

The material property relationship database 1 is stored in the storage device 102. Each of the steps constituting the information processing method of the first embodiment is implemented as software operating on the processor 101. The same applies to the relational formula extractor 20 of the search system 10, the relational formula/variable definition extraction step (S20) of the search method, the material property relationship database input step (S21), etc. of the second embodiment. Further, the graph generator 2 of the search system 10 and the graph generation step (S22) of the search method are also implemented as software operating on the processor 101, and the generated material property relational graph 3 is held in the storage device 102. The graph searcher 4 of the search system 10 may be implemented in the processor 101 on the server 100 side or may be implemented in the processors 111 and 121 in the user-side workstations 110 and 120. When implemented in the processor 101 on the server 100 side, the graph searcher 4 may be configured such that the search condition is input from the input unit 104 on the server 100 side, and the search result may be displayed on the display unit 105 or output to the storage device 102. Alternatively, the graph searcher 4 may be configured such that the search condition is input from the input units 114 and 124 of the user-side workstations 110 and 120, transmitted to the server 100 via the network 200, and the search result is returned to the user-side workstations 110 and 120 that had transmitted the search condition via the network 200, and displayed on the display units 115 and 125 or stored in the storage devices 112 and 122.

The graph searcher 4 may be implemented as software in the processors 111 and 121 of the user-side workstations 110 and 120 instead of or in addition to the server 100. The material property relational graph 3 is supplied from the server 100 upon request from the user-side workstations 110 and 120. The material property relational graph 3 may be configured to be downloaded and stored in the storage devices 112 and 122 of the workstations 110 and 120 before path search is started. In this manner, the path search process by the graph searcher 4 is speeded up. Especially when many users are to execute the graph search process at the same time, concentration of processing load on the server 100 can be prevented.

Further, the graph generator 2 may also be implemented as software in the processors 111 and 121 of the user-side workstations 110 and 120. Also in this case, when many users are to execute the graph search process at the same time, concentration of processing load on the server 100 can be prevented.

Specific Example

Example 1

Figure 18:
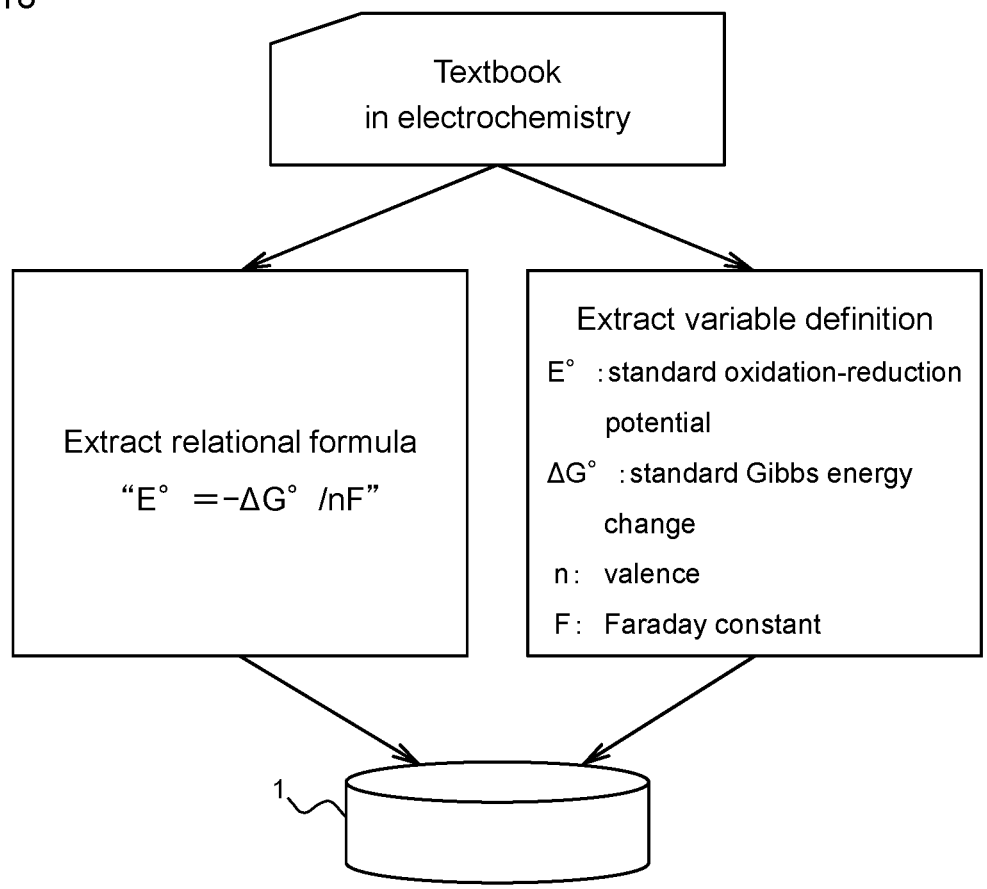
FIG. 18 is an explanatory diagram illustrating an example of extracting a relational formula from a textbook in the electrochemistry field and inputting the extracted relational formula in a material property relationship database.
Figure 19:
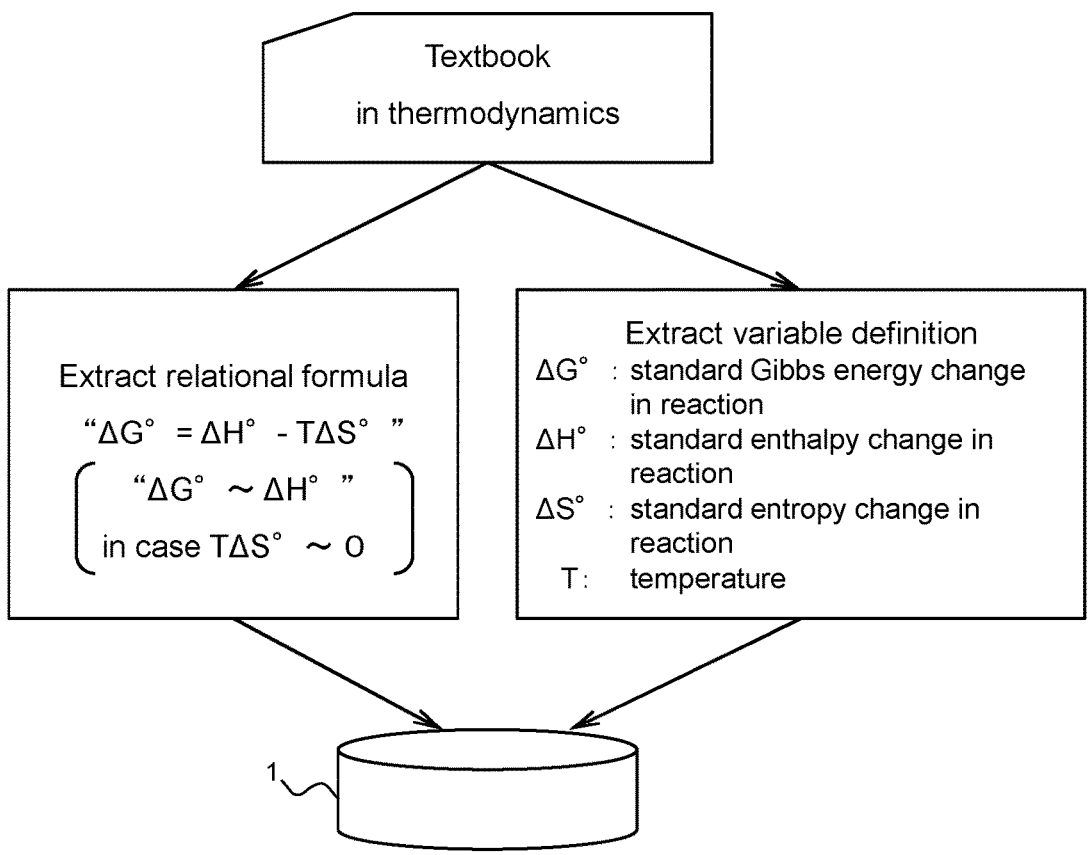
FIG. 19 is an explanatory diagram illustrating an example of extracting relational formula from a textbook in the thermochemistry field and inputting the extracted relational formula in a material property relationship database.
Figure 20:
FIG. 20 is an explanatory diagram illustrating an exemplary material property relationship database where extracted relational formulae have been input.
Figure 21:
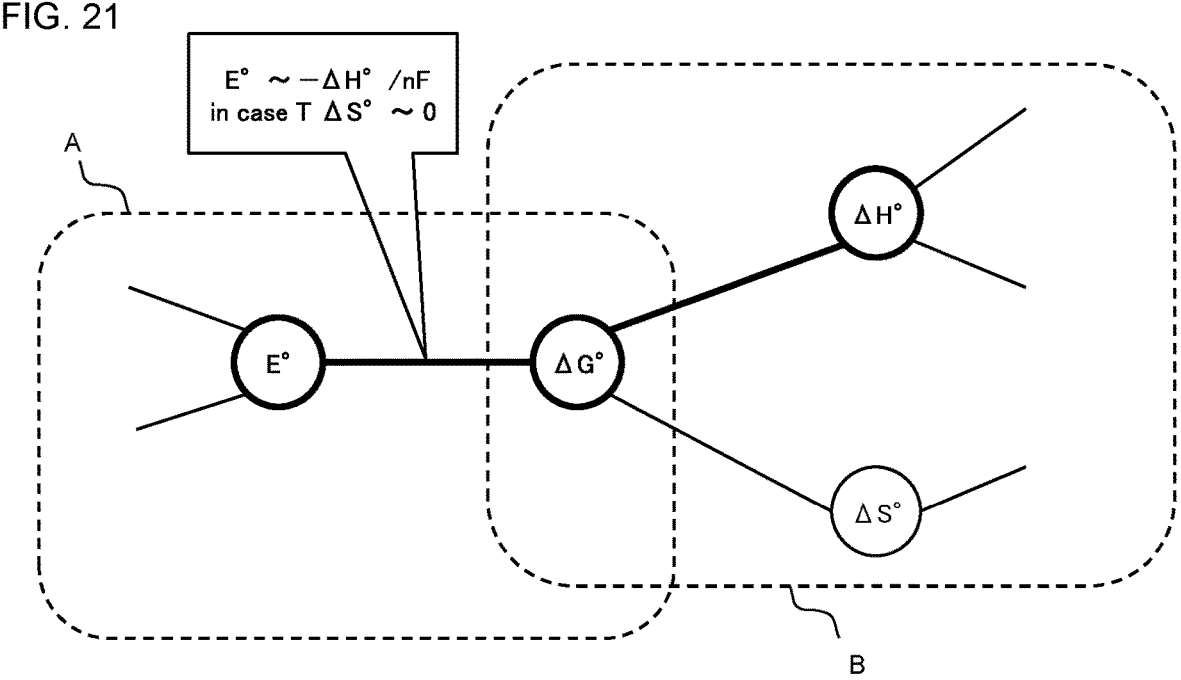
FIG. 21 is an explanatory diagram illustrating an exemplary path search executed on a material property relational graph generated from the material property relationship database illustrated in FIG. 20.

FIGS. 18 and 19 are explanatory diagrams illustrating an example of extracting a relational formula from a textbook in the field of electrochemistry and thermochemistry, respectively, and inputting the extracted relational formula in a material property relationship database 1. FIGS. 20 and 21 are explanatory diagrams illustrating an example of path search executed on the material property relationship database 1 where the extracted relational formulae have been input and a material property relational graph 3 generated from the material property relationship database 1.

The relational formula "$E°=-\Delta G°/nF$" and the definition of variables used in the relational formula are extracted from the textbook in the electrochemistry field illustrated in FIG. 18. When the textbook is a PDF file, the relational formula "$E°=-\Delta G°/nF$" is included in the form of image data. After scanning the PDF file that is a textbook and specifying the area that is an equation through image recognition, character recognition is executed to extract characters and signs and their positional relations. Then the extracted relational formula is expressed in a descriptive language for expressing equations, such as Presentation MathML. This is the operation described as the 2nd step S2 (FIG. 1, etc.) in the first embodiment.

At this stage, characters or character strings that can be variables used in the relational formula are extracted. However, whether a single character is used as a variable or character strings constituted by multiple characters represent a variable is not determined. Candidate variables are listed, and the candidate variables are searched for mainly in the text data before and after, especially before, the area where the relational formula is described in order to interpret the meaning of the found sentences. When a sentence defines the meaning of a variable, the variable and the parameter name are mutually associated and output. Among multiple candidate variables, those not found in sentences or those found a lot in sentences but none of the sentences is interpreted as defining the meaning of a variable are judged not as variables. Further, if text search for those candidates with a larger number of characters is preferentially executed and corresponding parameters are successfully extracted, text search of those candidates with fewer characters may not be executed. This is the operation described as the 4th step S4 (FIG. 1, etc.) in the first embodiment.

In the example illustrated in FIG. 18, variables "$E°$", "$\Delta G°$", "n" and "F" are extracted as "standard oxidation-reduction potential", "standard Gibbs energy change", "valence" and "Faraday constant", respectively. As mentioned above, regarding the candidate variable "$E°$", if a sentence that defines the meaning of the variable is specified and thus "$E°$" is specified as a variable, candidates "E" and "°" with fewer characters may be excluded from the candidate variables.

A relational formula extracted from image data included in a textbook and expressed in a descriptive language for expressing equations, such as Presentation MathML, is transformed into a mathematically meaningful descriptive language, such as Content MathML, using each variable of which definition has been extracted. This is the operation described as the 3rd step S3 (FIG. 1, etc.) in the first embodiment.

The material property relationship database 1 is searched for each of the extracted variables. For the variable on the left side of the relational formula, the effect-side material property parameter may be searched. For one or more variables included on the right side of the relational formula, the cause-side material property parameters may be searched. Records found on both the cause and effect sides are specified as a pair of material property parameters corresponding to the extracted relational formula. The found variables are specified as material property parameter names. The extracted relational formula expressed in a mathematically meaningful descriptive language such as Content MathML is input in the relational formula field of the record that stores the corresponding pair of material property parameters. In the material property relationship database 1 illustrated in FIG. 20, a record including a pair of material property parameters in which the cause-side material property parameter is "standard Gibbs energy change: $\Delta G°$" and the effect-side material property parameter is "standard oxidation-reduction potential: $E°$" is found. Thus the extracted relational formula "$E°=-\Delta G°/nF$" is input in the relational formula field of the record. While the relational formula is expressed in the same manner as the image information in FIG. 20, a relational formula described in a mathematically meaningful descriptive language such as Content MathML is input in practice. Variables other than material property parameters are also used in relational formulae. For example, variable "n" shown in FIG. 18 represents a valence and "F" represents a Faraday constant, which is a physical constant, neither of which is a material property parameter. These variables are not stored in the material property relationship database 1 and not found when searched, and thus are not specified as material property parameters. These are the operations described as the 5th and 6th steps (S5 and S6) (FIG. 1, etc.) in the first embodiment.

Next, as illustrated in FIG. 19, the relational formula "$\Delta G°=\Delta H°-T\Delta S°$" and definition of variables used in the relational formula are extracted from the textbook in the thermodynamics field. Variables "$\Delta G°$", "$\Delta H°$", "$\Delta S°$" and "T" are extracted as "standard Gibbs energy change of reaction", "standard enthalpy change of reaction", "standard entropy change of reaction" and "temperature", respectively. At this time, "$\Delta G° \sim \Delta H°$" is also extracted as another relational formula. This relational formula is an approximate expression in the case of the second term "$T\Delta S°\ll\Delta H°$". This is an exemplary operation described as "Extract Satisfying Condition of Relational Formula" in the first embodiment, and that "$T\Delta S°$" is sufficiently small, i.e., "$T\Delta S°\ll\Delta H°$" is extracted as the satisfying condition. More physicochemical conditions, such as temperature conditions and material names (substance names), may be extracted as satisfying conditions.

The material property relationship database 1 is searched for each extracted variable, and a record whose cause-side material property parameter is "standard enthalpy change of reaction: $\Delta H°$" and effect-side material property parameter is "standard Gibbs energy change of reaction: $\Delta G°$" (second record of FIG. 20) and a record whose cause-side material property parameter is "standard entropy change of reaction: ΔS" and effect-side material property parameter is "standard Gibbs energy change of reaction: ΔG°" (third record of FIG. 20) are found. At this point, no fourth record of FIG. 20 exists. The extracted relational formula "ΔG°=ΔH°−TΔS°" is input in the second record and the third record. At this time, the second record is also found for the approximate expression "ΔG° ~ΔH°". This is because the cause-side material property parameter and the effect-side material property parameter are the same. Since the relational formula "ΔG°=ΔH°−TΔS°" has already been input in the second record as described above, the second record is copied to create a new, fourth record. Then the approximate expression "ΔG°~ΔH°" is input in the relational formula field, and the satisfying condition "TΔS°<<ΔH°" of the relational formula is input in the condition field of the newly created fourth record.

FIG. 21 illustrates a part of the material property relational graph 3 generated from the material property relationship database 1 illustrated in FIG. 20. The part corresponds to the boundary between the area A representing the relation of the material properties in the electrochemistry field and the area B representing the relation of the material properties in the thermodynamic field. The area A includes node "E°" corresponding to "standard oxidation-reduction potential" and node "ΔG°" corresponding to "standard Gibbs energy change", and the area B includes node "ΔG°" corresponding to "standard Gibbs energy change in reaction", node "ΔH°" corresponding to "standard enthalpy change in reaction", and node "ΔS°" corresponding to "standard entropy change in reaction".

When a user executes material property search, a path consisting of nodes is extracted, which means "standard oxidation-reduction potential" changes depends on "standard enthalpy change of reaction", and a relational formula "E°~−ΔH°/nF" is given as dependence thereof. This relation is established only when "TΔS° ~0". This is a result of composing the relational formula of the first record "E°=−ΔG°/nF" and the relational formula (approximate expression) of the fourth record "ΔG°~ΔH°" of the material property relationship database 1 along the path of nodes "TΔS°<<ΔH°" is provided together as a condition under which the approximation that is the relational formula of the fourth record is satisfied. The path will be emphasized to the user by, for example, highlighting, and the composed relational formula and its condition will be displayed in a pop-up sub-window or other way. Displaying may be made in other ways.

As described above, a user can find a causal relation between material property parameters from across many technical fields: that is, the user can know that "standard oxidation-reduction potential" in the electrochemistry field and "standard enthalpy change of reaction" in the thermodynamic field are mutually related; in addition, the user can know the relational formula "E° ~ΔH°/nF" that quantitatively expresses the relation.

Example 2

Figure 22:
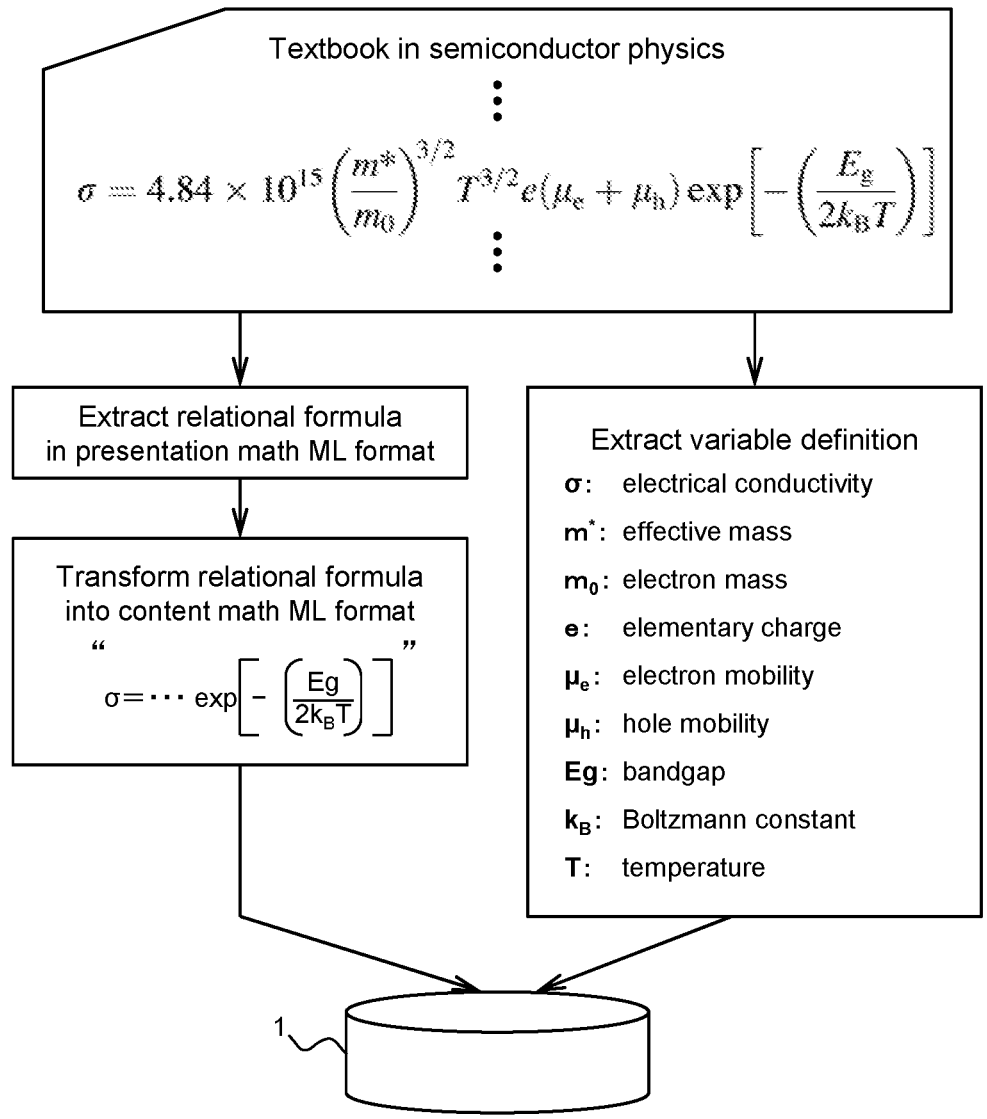
FIG. 22 is an explanatory diagram illustrating an example of extracting a relational formula from a textbook in the semiconductor physics field and inputting the extracted relational formula in a material property relationship database.
Figure 23:
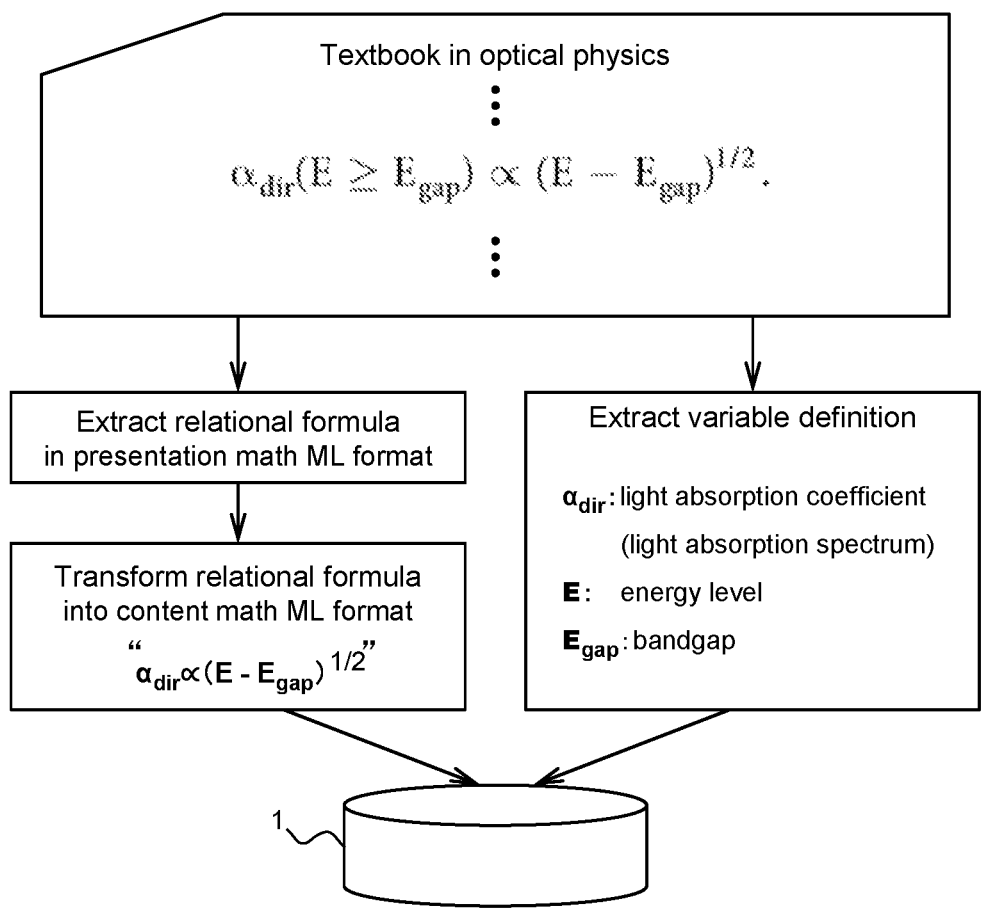
FIG. 23 is an explanatory diagram illustrating an example of extracting relational formula from a textbook in the field of optical physics and inputting the extracted relational formula in a material property relationship database.
Figure 24:
FIG. 24 is an explanatory diagram illustrating an exemplary material property relationship database where extracted relational formulae have been input.
Figure 25:
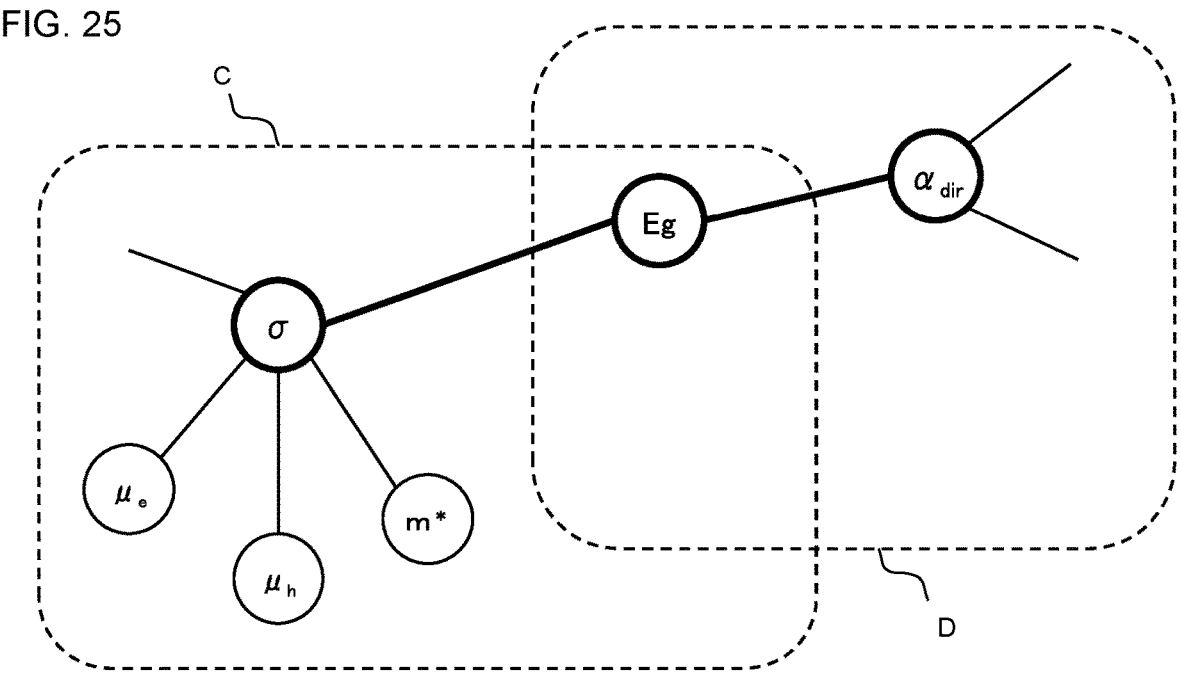
FIG. 25 is an explanatory diagram illustrating exemplary path search executed on a material property relational graph generated from the material property relationship database illustrated in FIG. 24.

FIGS. 22 and 23 are explanatory diagrams illustrating an example of extracting a relational formula from a textbook in the field of semiconductor physics and optical physics, respectively, and inputting the extracted relational formula in a material property relationship database 1. FIGS. 24 and 25 are explanatory diagrams illustrating an example of path search executed on the material property relationship database where the extracted relational formulae have been input and a graph generated from the material property relationship database.

As illustrated in FIG. 22, equation information indicating a relational formula for calculating variable 6 and definitions of variables used in the relational formula are extracted from the textbook in the field of semiconductor physics. For example, when the equation information indicating the relational formula is image data as illustrated in FIG. 22, the image data is transformed into Presentation MathML by recognizing arrangement of characters included in the image data. When a textbook is an electronic publication such as ePub, equation information for expressing relational formulae is often included in Presentation MathML, so it is only necessary to extract description of relevant parts. The definitions of variables used in the extracted relational formula are specified through, for example, natural language processing on the sentences before and after the relational formula in the textbook. In the example of FIG. 22, variables "σ", "m*", "$m_0$", "e", "$\mu_e$", "µh", "$E_g$", "$k_B$" and "T" included in the character strings extracted as the relational formulae are identified to indicate "electrical conductivity", "effective mass", "electron mass", "elementary charge", "electron mobility", "hole mobility", "bandgap", "Boltzmann constant" and "temperature", respectively. Using the specified variables, the relational formula is transformed into Content MathML. As illustrated in the first record of FIG. 24, the relational formula transformed into Content MathML is input in the relational formula field of a record where "bandgap: $E_g$" is the cause-side material property parameter and "electrical conductivity: σ" is the effect-side material property parameter. Although not illustrated, the same relational formula is input in a record whose pair of material property parameters is another material property parameter included in the relational formula and electrical conductivity σ.

As illustrated in FIG. 23, equation information indicating a relational formula for calculating variable a and definitions of variables used in the relational formula are extracted from the textbook in the field of optical physics. For example, as in FIG. 22, when equation information indicating the relational formula is image data, the image data is transformed into Presentation MathML through the same processing, and when the textbook is an electronic publication such as ePub, description of the corresponding part is extracted as equation information. Variables "$\alpha_{dir}$", "E" and "$E_{gap}$" are specified as variables from the character strings included in the extracted equation information, and the definition of each variable is specified as "light absorption coefficient (light absorption spectrum)", "energy level" and "bandgap" from the sentences of the textbook. As illustrated in the second record of FIG. 24, the relational formula transformed from Presentation MathML into Content MathML using the specified variables is input in the relational formula field of the record where "bandgap $E_{gap}$" is the cause-side material property parameter and "light absorption coefficient $\alpha_{dir}$" is the effect-side material property parameter.

FIG. 25 illustrates a part of the material property relational graph 3 generated from the material property relationship database 1 illustrated in FIG. 24. The part corresponds to the boundary between the area C representing the relation of the material properties in the semiconductor physics field and the area D representing the relation of the material properties in the optical physics field. The area C includes node "σ" corresponding to "electrical conductivity" and node "$E_g$" corresponding to "bandgap", and the area D includes node "$E_g$" corresponding to "bandgap" and node "$\alpha_{dir}$" corresponding to "light absorption coefficient".

When the user executes search for material properties, a path of nodes "$\sigma$"-"$E_g$"-"$\alpha_{dir}$" is extracted, and therefore it is known that "electrical conductivity" and "light absorption coefficient" change depending on each other. Unlike FIG. 21, the composite function is not shown.

In order to obtain the composite function, the relational formula where the cause-side and the effect-side material property parameters are exchanged is obtained for the first record or the second record in FIG. 24. This can be done through purely mathematical equation transformation. By exchanging the cause-side and the effect-side material property parameters for the first record, a relational formula for calculating "bandgap" is derived from "electrical conductivity", and by composing the derived relational formula with the relational formula for the second record, a quantitative relation that indicates how "light absorption coefficient" changes upon change of "electrical conductivity" can be obtained. Conversely, by exchanging the cause-side and the effect-side material property parameters for the second record, a relational formula for calculating "bandgap" is derived from "light absorption coefficient", and a quantitative relation of "electrical conductivity" with respect to "light absorption coefficient" can be obtained by composing the obtained relational formula with the relational formula of the first record. In this manner, the search system may be used by selecting out candidates of materials that can be used to obtain a substance having desired electrical conductivity based on the value of "light absorption coefficient". In actual situation, it is more convenient for users to use the quantitative relation that illustrates how "electrical conductivity" changes when the latter "light absorption coefficient" is changed. Therefore, in this embodiment, the user can request to output a quantitative relation in a desired direction.

The above-described relational formula derived by exchanging the cause-side material property parameters and the effect-side material property parameter may be stored in advance in the material property relationship database 1 in the 6th step shown in FIG. 9 as described in "Derivation of Relational Formula for Calculating Cause-Side Material Property Parameter" in the first embodiment.

While the invention made by the present inventor has been particularly described with respect to the embodiments thereof, the invention is not limited thereto and other changes may be made therein without departing from the spirit and scope of the invention.

INDUSTRIAL APPLICABILITY

The present invention relates to a search system and a search method using a database, and an information processing method for managing the database, and more particularly, to a search system and a search method capable of being desirably used for reflecting a quantitative relation when searching for a relation among multiple material property parameters, and for creating a database used therefor.

EXPLANATION OF SIGN

1 Material property relationship database
2 Graph generator
3 Material property relational graph
4 Graph searcher
5 Influencing factor database
6 Influence determiner
7 Search result output unit
10 Search system
11 Environment description database
12 Morphological description database
13 Size description database
20 Relational formula extractor
21 Relational formula recognizer
22 Variable definition recognizer
23 Relational formula generation unit
31 Search result
32 Dependence display area
100 Server
110, 120 Workstation
101, 111, 121 Processor
102, 112, 122 Storage Device
103, 113, 123 Network interface
104, 114, 124 Input unit
105, 115, 125 Display unit
200 Network

The invention claimed is:

1. A method for extracting, from an external source containing input data, a relational formula representing a relationship between two material property parameters constituting a pair of material property parameters, and inputting the extracted relational formula into a material property relationship database that includes pairs of mutually related material property parameters, the method being executed on a computer equipped with a storage device storing the material property relationship database, the method comprising:
   a 1st step of reading the input data, the input data including equation information, which is information displaying a relational formula using multiple variables representing material property parameters, and text data, which contains variable definitions describing which material property parameter each variable represents,
   a 2nd step of extracting the equation information from the input data,
   a 3rd step of extracting, from the extracted equation information, the relational formula and the multiple variables constituting the relational formula,
   a 4th step of extracting the variable definitions defining each of the multiple variables from the input data, the extracting including executing natural language processing on the text data,
   a 5th step of associating each of the extracted multiple variables with a material property parameter stored in the material property relationship database with reference to the material property relationship database, the associating being based on the description defining each of the multiple variables extracted in the 4th step, and
   a 6th step of inputting the relational formula into the material property relationship database in association with a pair of material property parameters corresponding to two of the multiple variables, so as to provide an updated material property relationship database,
   wherein the updated material property relationship database provides a database for the computer to search for relationships between material properties.

2. The method according to claim 1,
   wherein the pair of material property parameters is includes a cause-side material property parameter and an effect-side material property parameter, and wherein in the 6th step, the relational formula extracted in the 3rd step is input in the material property relationship database in association with a pair of material property parameters whose effect-side material property parameter is the material property parameter that corresponds to a variable, out of the multiple variables used in the relational formula, calculated by the relational formula.

3. The method according to claim 2, further comprising a 7th step of deriving a transformed relational formula by transforming the extracted relational formula to calculate a variable other than the variable calculated by the relational formula,
wherein in the 6th step, the transformed relational formula is input into the material property relationship database in association with a pair of material property parameters whose effect-side material property parameter is the material property parameter that corresponds to the variable calculated by the transformed relational formula.

4. The method according to claim 1, further comprising an 8th step of extracting, from the input data, a condition under which a relational formula is satisfied,
wherein in the 6th step, the condition is input into the material property relationship database in association with a pair of material property parameters including a material property parameter that corresponds to a variable calculated by the relational formula.

5. The method according to claim 4, wherein in the 6th step, in case another condition is already associated with the pair of material property parameters to be associated with the condition in the material property relationship database, the pair of material property parameters is copied to associate with the condition.

6. The method according to claim 1, further comprising a 9th step of determining whether each of the multiple variables extracted in the 3rd step is an independent variable or a dependent variable based on the material property relationship database, a 10th step of generating a dependent variable relational formula for calculating the dependent variable when the extracted variable is a dependent variable, and an 11th step of displaying the dependent variable relational formula.

7. The method according to claim 1, further comprising a 12th step of collating the relational formula with another relational formula in case the another relational formula is already stored in the material property relationship database in association with a pair of material property parameters including a material property parameter that corresponds to a variable calculated by the relational formula extracted in the 3rd step.

8. The method of claim 1, wherein the computer is further configured to remove inconsistencies in the descriptions defining each of the multiple variables.

9. The method of claim 1, wherein the external source is a document.

10. The method of claim 1, wherein the external source is a book.

11. A search system comprising:
a computer processor including:
   a storage device storing a material property relationship database;
   a graph generator; and
   a graph searcher,
wherein the material property relationship database stores, in association with each other, a pair of material property parameters, and a relational formula for calculating a value of one of the pair of material property parameters using a value of the other of the pair,
wherein the graph generator is configured to generate a graph where nodes represent material property parameters included in the pair of material property parameters, and edges represent in-between nodes corresponding to the pair of material property parameters,
wherein the graph searcher is configured to execute path search in the graph under given search conditions, and output a path as a search result together with a relational formula corresponding to edges included in the path, and
wherein the computer processor further comprises a relational formula extractor including a relational formula recognizer, a variable definition recognizer, and a relational formula generation unit, the relational formula extractor being configured to read input data from an external source, the input data including equation information, which is information displaying a relational formula using multiple variables representing material property parameters, and text data, which contains variable definitions describing which material property parameter each variable represents,
the relational formula recognizer being configured to extract the equation information included in the input data, and extract the relational formula included in the equation information and the multiple variables constituting the relational formula,
the variable definition recognizer being configured to recognize the description that defines a variable from a sentence included in the input data and extract the description as a variable definition by executing natural language processing on the text data, and
the relational formula generation unit is configured to associate a material property parameter stored in the material property relationship database with the variable based on the variable definition, and feed the relational formula into the material property relationship database, so as to provide an updated material property relationship database,
wherein the updated material property relationship database provides a database for the search system to search for relationships between material properties.

12. The search system according to claim 11,
wherein the material property relationship database stores a condition under which a relational formula is satisfied in association with the relational formula, and
wherein in the graph, the condition is given as an attribute to edges corresponding to the relational formula.

13. The search system according to claim 1,
wherein the material property relationship database is configured to store multiple relational formulae to be satisfied under different conditions for same pairs of material property parameters, and
wherein the graph generator generates, in the graph, multiple edges with which the multiple relational formulae to be satisfied under different conditions are associated individually between nodes corresponding to the same pairs of material property parameters.

14. The search system according to claim 11, wherein the graph searcher is configured to compose a relational formula corresponding to the multiple edges for the path included in the search result and constituted by the multiple edges and output the relational formula.

15. The search system according to claim 11, further comprising an influencing factor database, an influence determiner, and a search result output unit, wherein the influencing factor database is configured to store, in association with one another, at least one material property parameter stored in the material property relationship database, one or more influencing factors on which the material property parameter has dependence, and a relational formula indicating the dependence, wherein the relational formula generation unit is configured to associate an influencing factor stored in the influencing factor database with a variable based on the variable definition, and input the relational formula in the influencing factor database as the relational formula, wherein the influence determiner is configured to determine whether material property parameter corresponding to a node included in the search result is dependent on at least one influencing factor by referring to the influencing factor database, and wherein the search result output unit is configured to output, together with the search result, a combination of a material property parameter and an influencing factor determined by the influence determiner to have dependence, and the relational formula thereof.

16. A search method executed on a computer equipped with a storage device and refers to a material property relationship database stored in the storage device, the method comprising a relational formula/variable definition extraction step, a material property relationship database input step, a graph generation step, and a graph search step, wherein the material property relationship database is stored in the storage device with a pair of material property parameters and a relational formula associated with each other, the relational formula calculating a value of one of the pair of material property parameters using a value of the other of the pair, wherein in the relational formula/variable definition extraction step, a relational formula, variables of the relational formula, and variable definitions thereof are extracted from an external source containing input data including equation information, which is information displaying a relational formula using multiple variables representing material property parameters, and text data, which contains variable definitions describing which material property parameter each variable represents, wherein in the material property relationship database input step, the variables are associated with the material property parameters stored in the material property relationship database based on the variable definition, and the relational formula is input into the material property relationship database, so as to provide an updated material property relationship database to search for relationships between material properties, wherein in the graph generation step, a graph is generated where nodes represent material property parameters included in the pair of material property parameters, and edges represent in-between nodes corresponding to the pair of material property parameters, and wherein in the graph search step, path search in the graph is executed under given search conditions, and a path is output as a search result together with a relational formula corresponding to edges included in the path.

17. The search method according to claim 16, wherein the material property relationship database stores, in association with the relational formula, a condition under which a relational formula is satisfied, and wherein in the graph, the condition is given as an attribute to an edge corresponding to the relational formula.

18. The search method according to claim 16, wherein the material property relationship database is configured to store multiple relational formulae to be satisfied under different conditions for same pairs of material property parameters, and wherein in the graph generation step, multiple edges are generated, in the graph, with which the multiple relational formulae to be satisfied under different conditions are associated individually between nodes corresponding to the same pairs of material property parameters.

19. The search method according to claim 16, wherein in the graph search step, relational formulae corresponding to the multiple edges are composed and a composed formula is output for a path included in a search result and constituted by multiple edges.

20. The search method according to claim 16, further comprising an influence determination step of referring to an influencing factor database stored in the storage device or another storage device, and a search result output step, wherein in the influencing factor database, at least one material property parameter among multiple material property parameters stored in the material property relationship database, one or more influencing factors on which the material property parameter has dependence, and a relational formula indicating the dependence are associated with one another, wherein in the material property relationship database input step, the influential factor stored in the influential factor database is associated with a variable based on the variable definition extracted in the relational formula/variable definition extraction step and, the extracted relational formula is input in the influential factor database as the relational formula, wherein in the influence determination step, whether the material property parameter corresponding to the node included in the search result is dependent on at least one influencing factor is determined, and wherein in the search result output step, a combination of a material property parameter and an influencing factor determined in the influence determination step to have dependence, and the relational formula thereof are output together with the search result.

* * * * *